(12) United States Patent
Erdogan et al.

(10) Patent No.: US 8,958,156 B1
(45) Date of Patent: Feb. 17, 2015

(54) INTERFERENCE FILTER FOR NON-ZERO ANGLE OF INCIDENCE SPECTROSCOPY

(75) Inventors: Turan Erdogan, Spencerport, NY (US); Ligang Wang, Penfield, NY (US)

(73) Assignee: Semrock, Inc., Rochester, NY (US)

( * ) Notice: Subject to any disclaimer, the term of this patent is extended or adjusted under 35 U.S.C. 154(b) by 660 days.

(21) Appl. No.: 12/129,534

(22) Filed: May 29, 2008

Related U.S. Application Data

(60) Provisional application No. 60/940,701, filed on May 30, 2007.

(51) Int. Cl.
*G02B 1/10* (2006.01)
*G02B 5/28* (2006.01)

(52) U.S. Cl.
CPC . *G02B 5/28* (2013.01); *G02B 5/288* (2013.01)
USPC ............ 359/586; 359/583; 359/588; 359/589

(58) Field of Classification Search
USPC ................. 359/577, 580, 586, 588, 589, 583; 369/112.01
See application file for complete search history.

(56) References Cited

U.S. PATENT DOCUMENTS

| | | |
|---|---|---|
| 2,406,318 A | 8/1946 | Brace |
| 2,670,400 A | 2/1954 | Grunwald |
| 3,306,158 A | 2/1967 | Makabe et al. |
| 3,390,604 A | 7/1968 | Makabe |
| 3,492,478 A | 1/1970 | Smith |
| 3,666,351 A | 5/1972 | Pao |
| 3,759,604 A | 9/1973 | Thelen |
| 3,861,788 A | 1/1975 | Webster |
| 3,864,037 A | 2/1975 | Johnson |
| 4,009,453 A | 2/1977 | Mahlein |
| 4,082,464 A | 4/1978 | Johnson, Jr. |
| 4,084,909 A | 4/1978 | Mathisen |
| 4,141,653 A | 2/1979 | Arnold |
| 4,176,916 A | 12/1979 | Carpenter |
| 4,207,835 A | 6/1980 | Schwiecker et al. |
| 4,373,782 A | 2/1983 | Thelen |
| 4,395,090 A | 7/1983 | Mahlein |
| 4,410,272 A | 10/1983 | Beauvineau et al. |
| 4,461,532 A | 7/1984 | Sato et al. |
| 4,684,255 A | 8/1987 | Ford |

(Continued)

FOREIGN PATENT DOCUMENTS

| | | |
|---|---|---|
| DE | 20 2008 016 287 U1 | 4/2009 |
| EP | 1 130 432 A2 | 9/2001 |

(Continued)

OTHER PUBLICATIONS

German Cancer Research Center Office of Technology Transfer, *Technology Offer* "Device for tuning of color beam splitters (P-382)," Apr. 2009 (2 pages).
International Search Report and Written Opinion mailed Mar. 10, 2011 for PCT/US2011/020438, corresponding to U.S. Appl. No. 12/684,871 (10 pages).
Baumeister, *Optical Coating Technology*, (2004) p. 10, SPIE Press, Bellingham, Washington USA.

(Continued)

*Primary Examiner* — Audrey Y Chang
(74) *Attorney, Agent, or Firm* — Finnegan, Henderson, Farabow, Garrett & Dunner, LLP

(57) ABSTRACT

The present disclosure relates to thin film optical interference filters. The filters include a substrate and a plurality of alternating material layers deposited on the substrate. When operated at about 45° angle of incidence, the filters exhibit at least one of improved polarization splitting, edge steepness, bandpass bandwidth, and blocking, relative to conventional thin film interference filters.

15 Claims, 18 Drawing Sheets

(56) References Cited

U.S. PATENT DOCUMENTS

| | | | |
|---|---|---|---|
| 4,733,926 A | 3/1988 | Title | |
| 4,738,535 A | 4/1988 | Webster | |
| 4,772,798 A | 9/1988 | Craig | |
| 4,775,234 A | 10/1988 | Shimomura | |
| 4,925,259 A | 5/1990 | Emmett | |
| 5,034,613 A | 7/1991 | Denk et al. | |
| 5,132,826 A | 7/1992 | Johnson et al. | |
| 5,149,578 A | 9/1992 | Wheatley et al. | |
| 5,221,957 A | 6/1993 | Jannson et al. | |
| 5,400,174 A | 3/1995 | Pagis et al. | |
| 5,449,413 A | 9/1995 | Beauchamp et al. | |
| 5,481,402 A | 1/1996 | Cheng et al. | |
| 5,591,981 A | 1/1997 | Heffelfinger et al. | |
| 5,625,491 A | 4/1997 | von Gunten et al. | |
| 5,648,870 A * | 7/1997 | Mistutake | 359/487.05 |
| 5,767,965 A | 6/1998 | Zhou et al. | |
| 5,781,332 A | 7/1998 | Ogata | |
| 5,781,341 A | 7/1998 | Lee | |
| 5,796,512 A | 8/1998 | Wachman et al. | |
| 5,852,498 A | 12/1998 | Youvan et al. | |
| 5,914,817 A | 6/1999 | Browning et al. | |
| 5,926,317 A | 7/1999 | Cushing | |
| 5,943,129 A * | 8/1999 | Hoyt et al. | 356/318 |
| 5,953,169 A | 9/1999 | Tsai | |
| 6,075,599 A | 6/2000 | Milman et al. | |
| 6,110,337 A | 8/2000 | Sullivan et al. | |
| 6,115,180 A | 9/2000 | Hirai et al. | |
| 6,217,720 B1 | 4/2001 | Sullivan et al. | |
| 6,249,378 B1 | 6/2001 | Shimamura et al. | |
| 6,292,299 B1 | 9/2001 | Liou | |
| 6,344,653 B1 | 2/2002 | Webb et al. | |
| 6,362,904 B1 | 3/2002 | Cormack | |
| 6,611,378 B1 | 8/2003 | Wang et al. | |
| 6,700,690 B1 | 3/2004 | Buchsbaum et al. | |
| 6,781,757 B2 | 8/2004 | Cormack | |
| 6,809,859 B2 | 10/2004 | Erdogan et al. | |
| 6,879,619 B1 | 4/2005 | Green et al. | |
| 6,894,838 B2 * | 5/2005 | Mizrahi et al. | 359/584 |
| 6,943,938 B1 | 9/2005 | Liu et al. | |
| 7,050,224 B2 | 5/2006 | Kawamata et al. | |
| 7,068,430 B1 | 6/2006 | Clarke et al. | |
| 7,119,960 B1 | 10/2006 | Erdogan et al. | |
| 7,123,416 B1 | 10/2006 | Erdogan et al. | |
| 7,379,242 B2 | 5/2008 | Ushigome | |
| 7,411,679 B2 | 8/2008 | Erdogan et al. | |
| 7,420,678 B2 | 9/2008 | Lundgren et al. | |
| 7,453,568 B2 | 11/2008 | Kawamata et al. | |
| 7,961,392 B2 | 6/2011 | Maeda et al. | |
| 8,059,327 B1 | 11/2011 | Erdogan et al. | |
| 2002/0054614 A1 | 5/2002 | Jin | |
| 2004/0240093 A1 | 12/2004 | Yoshikawa et al. | |
| 2005/0171630 A1 | 8/2005 | Dinauer et al. | |
| 2006/0007547 A1 | 1/2006 | Kamikawa | |
| 2006/0158991 A1 * | 7/2006 | Hatano et al. | 369/112.01 |
| 2006/0228089 A1 | 10/2006 | Shimokozono et al. | |
| 2007/0268568 A1 | 11/2007 | Higashi et al. | |
| 2008/0037129 A1 | 2/2008 | Hodgson et al. | |
| 2008/0055584 A1 | 3/2008 | Pradhan et al. | |
| 2008/0055716 A1 | 3/2008 | Erdogan et al. | |
| 2008/0055717 A1 | 3/2008 | Pradhan et al. | |

FOREIGN PATENT DOCUMENTS

| | | |
|---|---|---|
| WO | WO 2004/061490 A1 | 7/2004 |
| WO | WO 2004/111717 A1 | 12/2004 |
| WO | WO 2006/080422 A1 | 8/2006 |

OTHER PUBLICATIONS

Thelen, *Design of Optical Interference Coatings*, (1989) p. 180-195, McGraw Hill New York, New York USA.

Wang, "Constrain of Coating Thickness on LaserMux," Semrock Memorandum (Jan. 9, 2007) and Attachment #1: Newport Tutorials entitled "Gaussian Beam Optics Tutorial" (Dec. 17, 2008).

R.-Y. Tsai, et al., "Comparative Study of Ultraviolet-Infrared Cutoff Filters Prepared by Reactive Electron-Beam Deposition and Reactive Ion-Assisted Deposition", Opt. Eng., May 1998, pp. 1475-1481 (7 pages).

T.R. Jensen, et al., "Environmentally Stable UV Raman Edge Filters", Society of Vacuum Coaters 43rd Annual Technical Conference Proceedings (2000) pp. 1-5 (5 pages).

H.A. Macleod, Thin-Film Optical Filters, Third Edition, Taylor & Francis, NY, 2001, pp. vii-xi, 20-37, 46-50, 210-392 (213 pages total).

A. Thelen, "Nonpolarizing edge filters," J. Opt. Soc. Am., vol. 71, pp. 309-314 (Mar. 1981)(6 pages).

A. Thelen, "Nonpolarizing edge filters: Part 2," Appl. Optics, vol. 23, pp. 3541-3543 (Oct. 15, 1984) (3 pages).

P. Yeh, *Optical Waves in Layered Media* John Wiley & Sons, New York, 1988, pp. v-x, 144-165, and 254-297 (38 pages).

A. Thelen, *Design of Optical Interference Coatings*, McGraw-Hill, New York, 1989, pp. v-viii, 177-196, and 250 (16 pages).

M. Lequime, "Tunable thin-film filters: review and perspectives," Proc. SPIE vol. 5250, (*Advances in Optical Thin Films*, Ed. By C. Amra, N. Kaiser, H.A. McLeod) pp. 302-311 (2004) (10 pages).

P.W. Baumeister, *Optical Coating Technology*, SPIE Press, Bellingham WA, 2004, pp. v-xviii, "5-41"-"5-43", "7-76"-"7-77". "8-11"-"8-17", and "10-9"-"10-13" (33 pages).

B.E. Perilloux, *Thin-Film design*, pp. i-xvi, 1-116 (SPIE Press, Bellingham Washington) (2002) (68 pages total).

USPTO Office Action in U.S. Appl. No. 12/684,871 mailed Apr. 12, 2012 (11 pages total).

D.S. Kliger, *Polarized Light in Optics and Spectroscopy*, pp. v-vii, 27-58, and 237-274 (Academic Press, Inc. Boston, MA) (1990) (40 pages total).

T. Baur "A New Type of Beam Splitting Polarizer Cube" (Meadowlark Optics, Inc.) (2005) (9 pages total).

"Basic Polarization Techniques and Devices" (Meadowlark Optics, Inc.) (2005) (7 pages total).

H. Fabricius et al., "Optimizing the phase retardation caused by optical coatings," Advances in Optical Thin Films III, Ed. By N. Kaiser at al., Proc. Of SPIE vol. 7101, (2008) pp. 710111-1-710111-12 (12 pages total).

H. Fabricius, "Synthesis and functioning of SMART coatings for application in compact instruments and sensors," DOPS-Nyt Jan. 2001, p. 28-38 (The Quarterly Journal of the Danish Optical Society) (11 pages total).

Software Spectra, *TFCalc Thin Film Design Software for Windows*, Ver. 3.5 (1985-2002) (Portland, OR) (144 pages total).

K.V. Popov et al., "Broadband high-reflection multilayer coatings at oblique angles of incidence," Apr. 1, 1997, vol. 36, No. 10, Applied Optics, pp. 2139-2151 (1997) (13 pages total).

A.V. Tikhonravov, "Some theoretical aspects of thin-film optics and their applications," Oct. 1, 1993, vol. 32, No. 28, Applied Optics, pp. 5417-5426 (1993) (10 pages total).

M. Banning "Practical Methods of Making and Using Multilayer Filters" J. Opt. Soc. Am. 37, pp. 792-795 (Oct. 1947) (6 pages total).

H. D. Polster "A Symmetrical All-Dielectric Interference Fiiter" J. Opt. Soc. Am, 42, pp. 21-23 (Jan. 1952) (4 pages total).

R. R. Willey, "Estimating the number of layers required and other properties of blocker and dichroic optical thin films." App. Opt. vol. 35, pp. 4982-4986 (Sept. 1, 1996) (5 pages total).

J. Reichmann. Chroma Handbook of Optical Filters for Fluorescence Microscopy, Chroma Technology Corp. (1998) (37 pages total).

P Verly, "Fourier transform approach for the estimation of optical thin film thickness." Conference Paper, Optical Interference Coatings, Banff, Canada, 2001, "TuA9-1"—"TuA9-3" (3 pages total).

R. R. Wiley, *Practical Design and Production of Optical Thin Films*, Second Edition, Revised and Expanded, CRC Press, 2002, Chapter 2.4, pp. 121-128 (9 pages total).

P. Baumeister, *Optical Coating Technology*, SPIE Press, Bellingham WA 2004, "5-58"—"5-68" (12 pages total).

* cited by examiner

INTERFERENCE FILTER FOR NON-ZERO ANGLE OF INCIDENCE SPECTROSCOPY

This application claims priority to U.S. Provisional Application No. 60/940,701, filed May 30, 2007, the contents of which are incorporated herein by reference.

The present disclosure relates to optical thin-film interference filters, including filters suitable for use in non-zero angle of incidence spectroscopy. The present disclosure also relates to spectroscopy systems including such filters, and methods for making such filters.

BACKGROUND OF THE DISCLOSURE

Thin film interference filters are important components in systems for optical measurement and analysis, such as Raman spectroscopy and fluorescence microscopy. In particular, thin film interference filters, such as optical edge filters, notch filters, and/or laser line filters (LLF's), are advantageously used in such systems to block unwanted light that would otherwise constitute or generate spurious optical signals and swamp the signals to be detected and analyzed. Thus, failure or inadequate performance of these filters can be fatal to operation of a system in which they are utilized.

In general, interference filters are wavelength-selective by virtue of the interference effects that take place between incident and reflected waves at boundaries between materials having different refractive indices. This interference effect is exploited in interference filters, which typically include a dielectric stack composed of multiple alternating layers of two or more dielectric materials having different refractive indices. In the case of a filter which substantially reflects at least one band of wavelengths and substantially transmits at least a second band of wavelengths immediately adjacent to the first band, such that the filter enables separation of the two bands of wavelengths by redirecting the reflected band, the resulting filter is called a "dichroic beamsplitter," or simply a "dichroic" filter.

In a typical interference filter, each of the respective layers of the filter stack is very thin, e.g., having an optical thickness (physical thickness times the refractive index of the layer) on the order of a quarter wavelength of light. These layers may be deposited on one or more substrates (e.g., a glass substrate) and in various configurations to provide one or more of long-wave-pass (also called long-pass), short-wave-pass (also called short-pass), band-pass, or band-rejection filter characteristics.

In the case of prior known edge filters, the filter is configured so as to exhibit a spectrum having a clearly defined edge, wherein unwanted light having wavelengths above or, alternatively, below a chosen "transition" wavelength $\lambda_T$ is blocked, whereas desired light is transmitted on the opposite side of $\lambda_T$. Edge filters which transmit optical wavelengths longer than $\lambda_T$ are called long-wave-pass (LWP) filters, and those that transmit wavelengths shorter than $\lambda_T$ are short-wave-pass (SWP) filters.

FIGS. 1A and 1B schematically illustrate the spectral transmission of idealized LWP and SWP filters, respectively. As shown in FIG. 1A, an idealized LWP filter blocks light with wavelengths below $\lambda_T$, and transmits wavelengths above $\lambda_T$. Conversely, as shown in FIG. 1B, an idealized SWP filter transmits light with wavelengths below $\lambda_T$, and blocks light with wavelength above $\lambda_T$.

Edge steepness and the relative amount of transmitted light are important parameters in many filter applications. As shown in FIGS. 1A and 1B, an idealized edge filter has a precise wavelength edge represented by a vertical line at $\lambda_T$. As such, an idealized filter has an "edge steepness" (i.e. a change in wavelength over a defined range of transmission) of 0 at $\lambda_T$. However, real edge filters change from blocking to transmission over a small but non-zero range of wavelengths, with increasing values of edge steepness reflecting an edge that is increasingly less steep. The transition of a real edge filter is therefore more accurately represented by a non-vertical but steeply sloped line at or near $\lambda_T$. Similarly, while an ideal edge filter transmits all light in the transmission region (transmission T=1), real filters have some amount of transmission loss, invariably blocking a small portion of the light to be transmitted (T<1).

As a result, the reported edge steepness of a real edge filter depends on the transmission range over which it is defined. Further, as will be discussed below, conventional edge filters exhibit polarization splitting when operated at a non-zero angle of incidence, in which case the corresponding spectra for s and p-polarized light may not have the same edge steepness.

Edge filters, notch filters, and laser line filters are particularly useful in optical measurement and analysis systems that use light from a light source, such as a laser, to excite/illuminate a sample at one wavelength $\lambda_L$ (or a small band of wavelengths) and measure or view an optical response of the excited sample at other wavelengths. The excitation light $\lambda_L$ is delivered to the sample by an excitation light path, and the optical response of the sample is delivered to the eye or measuring instrument by a collection path. Notch filters are generally specialized implementations of edge filters, in that they exhibit a long wave edge and a short wave edge bordering a narrow region of low transmission. Laser line filters are generally configured so as to transmit as much light from a desired wavelength as possible, while blocking other wavelengths.

These filters have been used to block spurious or unwanted light from the excitation and collection paths of an optical system. In the case of edge filters, filters having higher edge steepness (i.e., a smaller difference in wavelength over a defined transmission range) are capable of more effectively blocking spurious or unwanted light signals. Further, edge filters having lower transmission loss, if placed in the collection path, are capable of passing more light from the sample to the measuring instrument. Similarly, LLF's having lower transmission loss, if placed in the excitation path, are capable of passing more excitation light from the light source (e.g., a laser) to the sample.

Raman spectroscopy is one example of an optical analysis system that advantageously employs dichroic/interference filters. In Raman spectroscopy, molecular material is irradiated with excitation light, i.e., high intensity light of a given wavelength $\lambda_L$ (or range of wavelengths). Upon irradiation, the molecular material scatters the excitation light. A small portion of the scattered excitation light is "Raman shifted," i.e., it is shifted in wavelength above and/or below $\lambda_L$. This Raman shifting is attributed to the interaction of the light with resonant molecular structures within the material, and the spectral distribution of the Raman shifted light provides a spectral "fingerprint" characteristic of the composition of the material. However, the bulk portion of the scattered excitation light is "Rayleigh scattered," i.e., it is scattered without a shift in wavelength.

Because the amount of Raman shifted light is very small relative to the amount of Rayleigh scattered light, it is necessary to filter the Raleigh scattered light from the collection path before it reaches the detector. Without such filtering, the Rayleigh scattered light will swamp the detector, and may excite spurious Raman scattering in the collection path. Filtering of the Rayleigh scattered light can be accomplished, for example, by placing an edge filter, such as a LWP filter having a transition wavelength $\lambda_T$ just above $\lambda_L$ (or range of wavelengths) between the sample and the detector. In this position, the LWP filter ensures that the light reaching the detector is predominantly long-wavelength Raman-shifted light from the sample. Similar arrangements using edge filters can be used to analyze short wavelength Raman-shifted light.

In an ideal Raman spectroscopy setup, a filter, such as a notch or edge filter, is configured such that it blocks 100% of light having a wavelength $\lambda_L$ (or range of wavelengths) from reaching the detector, while allowing desired light to be passed to the detector for measurement. This could be accomplished for example, if the filters were configured so as to exhibit an ideal stopband that blocks 100% of light having a wavelength $\lambda_L$ (or range of wavelengths).

Conventional filters, however, exhibit narrow blocking or transmission bands that exhibit a level of transmission and/or blocking that is less than optimum. The "blocking" of a filter at a wavelength or over a region of wavelengths is typically measured in optical density ("OD" where $OD=-\log_{10}(T)$, T being transmission of the filter at a particular wavelength). Conventional filters that achieve high OD values at certain wavelengths or wavelength regions may not necessarily also achieve high transmission (in excess of 50%, for example) at any other wavelengths or wavelength regions. High OD is generally exhibited in a fundamental "stopband" wavelength region, and such stopbands have associated with them higher-order harmonic stopband regions occurring at other wavelength regions.

These higher-order stopbands are one reason why it is difficult to achieve high transmission at wavelengths shorter than those over which high blocking occurs. A stopband is a range of wavelengths over which transmitted light is strongly attenuated ($T \leq 10\%$) due to constructive interference of the many partial waves of light reflected off of a structure with a periodic or nearly periodic variation of the index of refraction, as found in a thin-film interference filter. For a "quarter wavelength stack" structure comprised of alternating layers of high- and low-index materials, each of which is approximately one quarter of a particular wavelength $\lambda_0$ thick (in the material), the "fundamental" stopband is roughly centered on $\lambda_0$ and ranges from approximately $\lambda_0/(1+x)$ to $\lambda_0/(1-x)$, where x is related to the high and low index of refraction values, $n_H$ and $n_L$, respectively, according to $$x = \frac{2}{\pi}\arcsin\left(\frac{n_H - n_L}{n_H + n_L}\right).$$

If the layer-to-layer index of refraction variation is not a purely sinusoidal variation, but rather changes abruptly, as is typically the case in a multi-layer thin-film interference filter, higher-order stopbands exist at shorter wavelengths. For example, a quarter-wave stack having such abrupt refractive index changes exhibits "odd-harmonic" stopbands that occur approximately at the wavelengths $\lambda_0/3$, $\lambda_0/5$, etc., and that range from approximately $\lambda_0/(3+x)$ to $\lambda_0(3-x)$, for the third-order stopband, $\lambda_0/(5+x)$ to $\lambda_0/(5-x)$, for the fifth-order stopband, and so on. If the layers are not exactly a quarter-wave thick, there may also be "even-harmonic" stopbands that occur approximately at the wavelengths $\lambda_0/2$, $\lambda_0/4$, etc.

In general, known filters achieve high blocking over a wide range by utilizing a fundamental stopband, by combining multiple fundamental stopbands, or by "chirping" (gradually varying) the layers associated with one or more fundamental stopbands. Regardless of the approach, the higher-order harmonic stopbands associated with these blocking layers inhibit transmission at wavelengths shorter than the fundamental stopband or stopbands.

FIG. 2 schematically illustrates a Raman spectroscopy system 10 having a standard configuration. As shown, this standard configuration includes a light source 1, such as a laser, an excitation filter 2, a sample 3, a collection filter 4, and a detector 5. In operation, light source 1 emits light having a wavelength $\lambda_L$ (or range of wavelengths) which passes though excitation filter 2 and illuminates sample 3 directly. Sample 3 scatters Raman shifted and unshifted excitation (Rayleigh scattered) light. Collection filter 4 is positioned between sample 3 and detector 5, such as a spectrophotometer. Collection filter 4 is configured to block the Rayleigh scattered light from sample 3 but transmit as much of the Raman shifted light as possible, and as close to $\lambda_L$ as possible.

In focusing or imaging systems that utilize high numerical aperture (high-NA) collection optics, however, it is desirable for light from the light source and the collected signal light to share a common path. To meet this requirement, a two-filter solution is ideal. FIG. 3 schematically illustrates a Raman spectroscopy system 20 having such a configuration.

As shown, this configuration generally includes a light source 11, such as a laser, an excitation filter 12, a sample 13, a collection filter 14, a detector 15, such as a spectrophotometer, and a beamsplitter optical filter 16. Beamsplitter optical filter 16 is oriented at non-zero angle of incidence, e.g., about 45°, relative to light incident from light source 11, and is configured to reflect incident light from light source 11 onto sample 13, while transmitting Raman scattered light returning from Sample 13. Collection filter 14 is used in conjunction with beamsplitter optical filter 16 to ensure complete blocking of incident light that is Rayleigh scattered or reflected from sample 13. Due to the orientation of beamsplitter optical filter 16 relative to light from light source 11, the system shown in FIG. 3 is configured for so called, "non-zero angle of incidence" spectroscopy.

Increasing the angle of incidence of a traditional interference filter from normal generally affects the spectrum of the filter in two ways. First, the features of the filter spectrum are shifted to shorter wavelengths. And second, as the angle of the filter is further increased from normal, the filter spectrum exhibits progressively increasing "polarization splitting." That is, the filter produces two distinct spectra, one for s-polarized light, and one for p-polarized light. The relative difference between the s and p spectra at a given point is generally called "polarization splitting."

To illustrate this principal, reference is made to FIGS. 4A and 4B which are plots of polarization splitting vs. angle of incidence for a quarter wave stack based on $SiO_2$ and $Ta_2O_5$ centered at 500 nm. In the plot of FIG. 4A, the bandwidths of the stopbands associated with light of s polarization and p polarization are shown, with the bandwidths measured in so-called "g-space." The parameter $g=\lambda_0/\lambda$, is inversely proportional to wavelength and therefore directly proportional to optical frequency, and equals 1 at the wavelength $\lambda_0$ which is at the center of a fundamental stopband associated with a stack of thin film layers each equal to $\lambda_0/4n$ in thickness, where n is the index of refraction of each layer. The bandwidth in g-space is therefore equal to the difference between $\lambda_0/\lambda_S$ and $\lambda_0/\lambda_L$, where $\lambda_S$ and $\lambda_L$ are the short-wavelength and long-wavelength edges of the stopband, respectively. The polarization splitting in g-space is thus simply one half of the difference between the bandwidths in g-space for s-polarized and p-polarized light. As shown in FIG. 4B, the stack exhibits polarization splitting of about 0.04 g-numbers when operated at 45° AOI. Increasing AOI to 60° results in polarization splitting of almost 0.08 g-numbers. Decreasing AOI to 20° results in polarization splitting of less than 0.02 g-numbers.

Many uses for thin film interference filters are known. For example, U.S. Pat. No. 7,068,430, which is incorporated herein by reference, discusses the use of such filters in Fluorescence spectroscopy and other quantification techniques.

Dichroic optical filters have been proposed for use in optical systems employing a two filter design, such as the one shown in FIG. 3. However, as described above and shown in FIG. 4, traditional dichroic filters exhibit substantial polarization splitting, particularly when operated at about 45° Angle of incidence. This polarization splitting arises from the particular construction of a dichroic filter. As mentioned previously, traditional dichroic filters are generally made up of alternating thin material layers having differing refractive index. In addition to the refractive index of each layer being different than that of an adjacent layer, the effective refractive indices of each individual layer differ with respect to different polarizations of light. That is, the effective refractive index for a layer is different for p-polarized light than it is for s-polarized light. As a result, s-polarized and p-polarized light are shifted to different degrees upon passing through each layer in a dichroic filter. This difference in shift ultimately offsets the filter spectra corresponding to these differing polarizations, resulting in polarization splitting.

If a traditional dichroic filter is based on the first order stopband of an angle-matched quarter-wave stack, estimating the polarization splitting between the stopband bandwidths of the filter is relatively straightforward. That is, assuming the dichroic filter is made up of two materials having indices of $n_H$ and $n_L$, respectively, at 45° angle of incidence, the effective indices can be calculated as follows:

$$n_L^S = \sqrt{n_L^2 - \sin^2(AOI)} \tag{1}$$

$$n_H^S = \sqrt{n_H^2 - \sin^2(AOI)} \tag{2}$$

$$n_L^P = \frac{n_L^2}{\sqrt{n_L^2 - \sin^2(AOI)}} \tag{3}$$

$$n_H^P = \frac{n_H^2}{\sqrt{n_H^2 - \sin^2(AOI)}} \tag{4}$$

Wherein:
AOI is the incident angle in air, which is assumed to the incident medium;
$n_L^P$ and $n_L^S$ are the effective refractive index of the low index material in the dichroic stack for p-polarized light and s-polarized light, respectively; \
$n_H^P$ and $n_H^S$ are the effective refractive index of the high index material in the dichroic stack for p-polarized light and s-polarized light, respectively; and
$n_H^2$ and $n_L^2$ are the squares of the high and low refractive indexes, respectively, associated with the two materials, and which are independent of polarization.

The bandwidths and polarization splitting of the first-order stopband for the two polarizations may then be calculated as follows:

$$\Delta g^S = \frac{4}{\pi} \sin^{-1}\left(\frac{n_H^S - n_L^S}{n_H^S + n_L^S}\right) \tag{5}$$

$$\Delta g^P = \frac{4}{\pi} \sin^{-1}\left(\frac{n_H^P - n_L^P}{n_H^P + n_L^P}\right) \tag{6}$$

$$PS_g = \frac{\Delta g^S - \Delta g^P}{2} \tag{7}$$

Wherein:
$\Delta g^S$ and $\Delta g^P$ are the bandwidths of the first order (fundamental) stopband for s-polarized light and p-polarized light, respectively, in g-space; and
$PS_g$ is the polarization splitting for the first-order stopband in g-space. Alternatively, the polarization splitting may be expressed in terms of wavelength. For example, $$PS_\lambda = \frac{\lambda_0}{1 - \Delta g^S/2} - \frac{\lambda_0}{1 - \Delta g^P/2} \tag{8}$$

wherein:
$PS_\lambda$ is the polarization splitting of the long-wavelength edge of the fundamental stopband (the edge associated with a long-pass filter).
Often this value is expressed as a dimensionless value by taking its ratio to the average wavelength of the edges associated with s- and p-polarizations and expressing it as a percentage.

Polarization splitting has been utilized to design polarizing filters where high transmission and blocking are achieved for s and p polarizations, respectively, over a defined wavelength band. However, in the context of edge filters and beamsplitter optical filters, polarization splitting severely limits the edge steepness of light having average polarization. Thus, it is desirable to minimize polarization splitting as much as possible.

Several ways have been proposed to minimize polarization splitting. For example, one method proposed by Thelen (See A. Thelen, "Design of Optical Interference Coatings," McGraw Hill, 1989) utilizes tuning spacers of a multi-cavity Fabry-Perot bandpass filter to align the edges of spectrum of s and p-polarized light. However, this method has significant limitations when used to create dichroic filters.

In Thelen's method, the starting layer structure is that of a multi-cavity Fabry-Perot bandpass filter with spacer layers having optical thickness equal to multiple half-waves of the reference wavelength used to define the associated stopband. In addition, the edge of the resulting dichroic must be essentially at the center of the associated stopband. This is unlike the filters according to the present disclosure discussed below, which differ from Thelen's approach both in layer structure and placement of the dichroic edge with respect to the stopband. Indeed, as discussed below, filters according to the present disclosure do not contain the spacer layers required by Thelen's approach, and the dichroic edge may be placed virtually anywhere with respect to the location of the stopband.

In addition, it has been shown that decreasing stopband bandwidth can result in a corresponding decrease in polarization splitting. In the case of a filter having a second order stopband, the bandwidth of the stopband is proportional to the material mismatch in the dielectric stack making up the filter, where "mismatch" refers to the deviation of the layer thicknesses from one quarter of a wavelength, while keeping the sum of the thicknesses of each pair of high- and low-index layers equal to approximately one half of a wavelength. The greater the mismatch, the higher the degree of polarization splitting, and vice versa. Thus, it has been shown that polarization splitting can be minimized by utilizing different (e.g., higher-order) stopbands and adjusting material mismatch in the dielectric stack making up a dichroic filter.

However, while this method is effective, small mismatch always results in a filter having a narrow blocking region and lower blocking level, which is often not acceptable. Enhancement of the blocking region can be achieved, but only by increasing the number of layers in the dielectric stack. As a result, the performance of a traditional dichroic filter based on a second order stopband is typically limited by the maximum coating thickness allowed by the manufacturing process.

In addition, dual notch dichroic beamsplitters have been proposed for use in optical systems having dual filter designs. FIG. 5 is a measured spectrum of unpolarized light passing through an exemplary dual notch dichroic beamsplitter. As shown, this filter exhibits two narrow stopband regions 62 and 64 separated by a passband region having very narrow bandwidth 66. The spectrum also exhibits a relatively narrow bandpass region 68 between stopband region 64 and a fundamental stopband above about 750 nm (not shown)

While prior known interference filters are useful for many applications, they generally exhibit unsatisfactory characteristics when operated at about 45° angle of incidence. For example, the dual notch filter shown in FIG. 5 exhibits polarization splitting of 0.58% at one edge of stopband 62, and 0.4% at one edge of stopband 64. However, this filter exhibits a relative passband bandwidth of only about 30%, which is unsatisfactory. The relative passband bandwidth is the ratio of the difference between the long-wavelength of the passband and the dichroic edge wavelength to the dichroic edge wavelength (for a long-pass dichroic filter). Further, this filter exhibits relatively poor edge steepness of 1.26% at one edge of stopband 62, and 0.79% at one edge of stopband 64, which are insufficient for many applications. The edge steepness here is defined as the normalized wavelength difference between 10% and 90% transmission wavelengths for average polarized light.

Finally, angle matched notch filters have also been proposed for use in non-zero angle of incidence spectroscopy. Notch filters are described in detail in U.S. Pat. No. 7,123, 416, the contents of which are incorporated herein by reference. However, when these filters are operated at about 45° Angle of incidence, they suffer from significant polarization splitting, as shown in FIG. 6 (where 72, 74, and 76 correspond to the s spectrum, p spectrum, and average spectrum, respectively)F and described above. Accordingly, these types of filters exhibit significant limitations when used in many optical measurement techniques.

Thus, there is a need for improved interference filters that, when operated at about 45° angle of incidence, exhibit substantially improved properties relative to prior known filters. In particular, there is a desire in the art for improved interference filters that, when operated at about 45° angle of incidence, exhibit at least one of improved polarization splitting, passband bandwidth, edge steepness, and blocking, relative to prior known filters.

SUMMARY OF THE DISCLOSURE

The present disclosure provides optical interference filters that are suitable, for example, for use in Raman spectroscopy, fluorescence imaging, and/or quantification applications. Among other things, these filters exhibit substantially better performance characteristics when operated at about 45° angle of incidence, relative to prior known interference filters. In particular, the present disclosure provides optical filters that exhibit at least one of improved polarization splitting, edge steepness, passband bandwidth, and blocking, relative to prior known interference filters.

Consistent with the present disclosure are optical filters that include a substrate and a plurality of alternating first and second material layers on the substrate. The alternating first and second material layers have respectively different refractive indices. For the purposes of this disclosure, this structure is referred to as the "basic structure."

As will be discussed at length below, the plurality of alternating material layers of filters in accordance with the present disclosure may be configured so as to achieve one or more of a variety of desired optical characteristics. In some embodiments, these layers are configured so as to obtain filters that exhibit, when light impinges on the filter at about 45° angle of incidence, at least one spectrum having a first stopband region and a second stopband region separated by a passband region. Thus, filters in accordance with the present disclosure may, for example, exhibit a first spectrum for p-polarized light, a second spectrum for s-polarized light, and an average spectrum corresponding to the average of the s and p spectra.

In addition, the plurality of first and second material layers can be configured such that the first stopband region correlates to a fundamental stopband of the filter, whereas the second stopband correlates to a harmonic of the first stopband region, or a non-harmonic of the first stopband region, such as a passband defect. A non-harmonic stopband is a stopband that occurs in one of the passband regions on either side of a fundamental stopband, and does not occur at a wavelength which is an odd or even harmonic of the fundamental stopband. A non-harmonic stopband may be created by optimizing the thicknesses of the nearly quarter-wavelength-thick layers which form the fundamental stopband in such a way as to cause the optical interference of light in the layer structure to exhibit strong reflection over a region within one passband, while exhibiting high transmission with relatively low ripple over the remaining portion of the passband. Hence, when formed this way, this type of stopband is referred to here as a "passband defect."

Further, the plurality of first and second material layers in filters in accordance with the present disclosure may be configured so as to optimize one or more characteristics of the filter spectrum. For example, the plurality of layers may be configured so as to optimize at least one of polarization splitting, edge steepness, blocking, and passband bandwidth exhibited by the filter spectrum, particularly when the filter is operated at about 45° angle of incidence. In some embodiments, filters in accordance with the disclosure may be configured so as to optimize two or more of these features relative to one another. Moreover, these filters may be configured so as to optimize at least one of the aforementioned characteristics in at least one region of the filter spectrum, such as at the edge or base of a stopband region.

The present disclosure also describes methods of making the optical filters described herein, as well as systems using the optical filters described herein. Thus, consistent with the present disclosure are optical filters having the structure described herein, and which are produced by known deposition techniques, such computer controlled ion beam sputtering.

Also consistent with the present disclosure are optical systems that incorporate at least one of the filters described herein as an optical filter. For example, these systems may include the filters described herein as an edge, laser line, or dichroic beamsplitter filter for non-zero angle of incidence spectroscopy. Of course, the filters described herein may also be used in other systems and in other ways consistent with the use of previously known optical filters.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The advantages, nature, and various additional features of the disclosure will appear more fully upon consideration of the illustrative embodiments described below in detail in connection with the accompanying drawings. In the drawings.

DETAILED DESCRIPTION

Figure 1A:
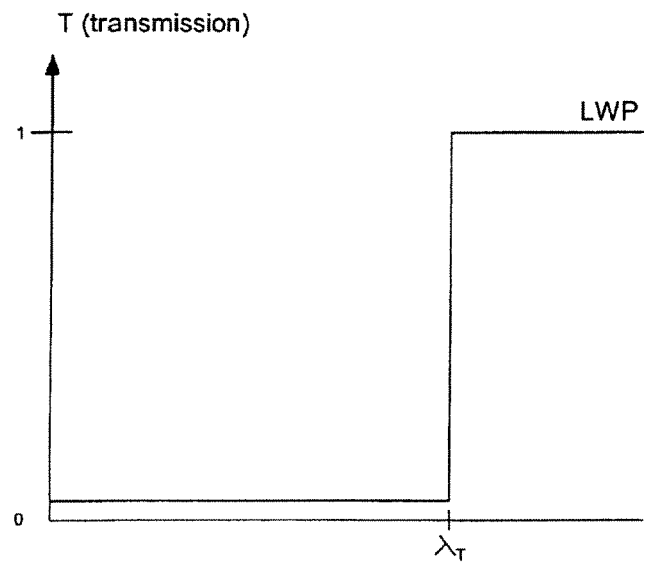
FIG. 1A is a spectrum of an idealized long wave pass interference filter.
Figure 1B:
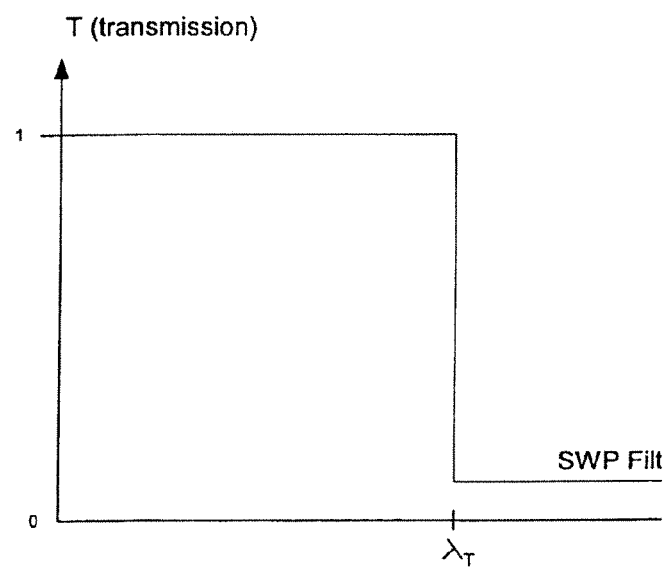
FIG. 1B is a spectrum of an idealized short wave pass interference filter.

Reference will now be made in detail to various exemplary embodiments of the present disclosure, examples of which are illustrated in the accompanying drawings. Wherever possible, the same reference numbers will be used throughout the drawings to refer to the same or like parts.

One aspect of the present disclosure relates to optical interference filters that exhibit improved characteristics when operated at about 45° Angle of incidence, relative to traditional optical interference filters.

As used herein, the term, "about 45° angle of incidence" means that the filter in question is oriented such that light from a light source impinges on a surface of the filter at an angle ranging from about 40° to about 50°, unless otherwise specified. Of course, the filters according to the present disclosure may be operated at any other angle of incidence. For example, the filters according to the present disclosure may be operated at an angle of incidence chosen from about 43° to about 48°, from about 44° to about 46°, and substantially 45°. In some embodiments of the present disclosure, the filters described herein are operated at substantially 45° angle of incidence.

All of the optical filters according to the present disclosure generally include the same basic structure. That is, they generally include a transparent substrate and a plurality of alternating first and second material layers deposited on a surface of the substrate. The plurality of alternating first and second material layers have respectively different refractive indices.

A wide variety of materials may be used to form the alternating first and second material layers. Among such materials, non-limiting mention is made of metals, metallic and non-metallic oxides, transparent polymeric materials, and so called "soft" coatings, such as sodium aluminum fluoride ($Na_3AlF_6$) and zinc sulfide (ZnS). Further non-limiting mention is made of metallic oxides chosen from $SiO_2$, $Ta_2O_5$, $Nb_2O_5$, $HfO_2$, $TiO_2$, and $Al_2O_5$. In some embodiments of the present disclosure, the first and second material layers are $Nb_2O_5$ and $SiO_2$, respectively Filters in accordance with the present disclosure may be manufactured using deposition methods and techniques that are known in the art. For example, these filters may be made with a computer controlled ion beam sputtering system, such as the one described in U.S. Pat. No. 7,068,430, which is incorporated herein by reference. In general, such a system is capable of depositing a plurality of alternating material layers, wherein the thickness of each layer may be precisely controlled.

Further, filter designs in accordance with the present disclosure may be produced by known thin-film filter design techniques. For example, these filter designs may be produced by optimizing the filter spectra and structure of an initial design, such as a traditional short wave pass or long wave pass interference filter against a target spectrum using known optical optimization routines. Non-limiting examples of such optimization routines include the variable-metric or simplex methods implemented in standard commercial thin-film design software packages, such as TFCalc by Software Spectra, Inc. and The Essential Macleod by Thin Film Center, Inc. A detailed description of filter design techniques that can be used to produce filter designs according to the present disclosure may be found in U.S. Pat. No. 7,068,430, which is incorporated herein by reference.

The filters of the present disclosure differ from traditional interference filters in that during production, the individual thicknesses of the alternating material layers making up the interference stack are carefully controlled so as to achieve desired optical characteristics that are not exhibited by prior known optical filters. For example, optical filters consistent with the present disclosure may be configured so as to exhibit, when operated at about 45° angle of incidence, at least one of improved polarization splitting, edge steepness, passband bandwidth, and blocking, relative to prior known interference filters.

Accordingly, one aspect of the present disclosure relates to interference filters having the basic structure described above, wherein the alternating first and second material layers are configured such that when light from a light source impinges on the filter at an angle of incidence of about 45°, the filter defines a spectrum for s-polarized light, a spectrum for p-polarized light, and an average spectrum corresponding to light having an average polarization (i.e., corresponding to an average of the s and p spectra). Each of these spectra includes a first stopband region and a second stopband region separated by a passband region.

Figure 7:
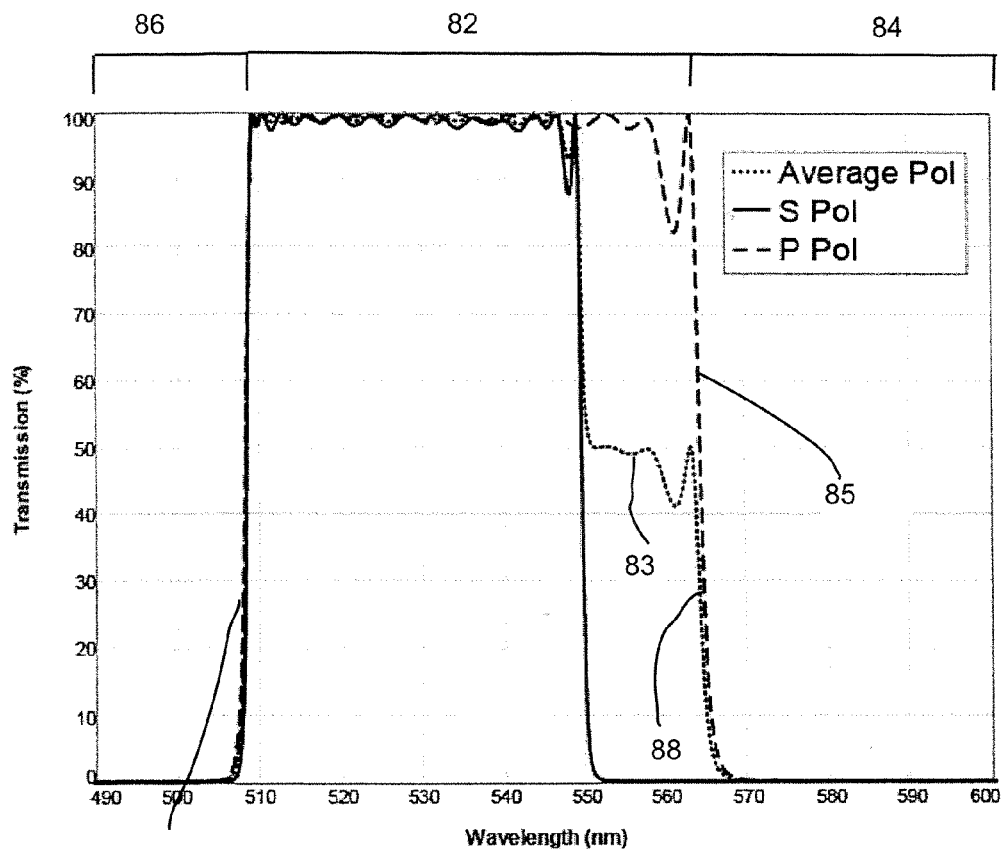
FIG. 7 is a calculated spectrum of a minimal polarization splitting dichroic filter in accordance with the present disclosure.
Figure 8:
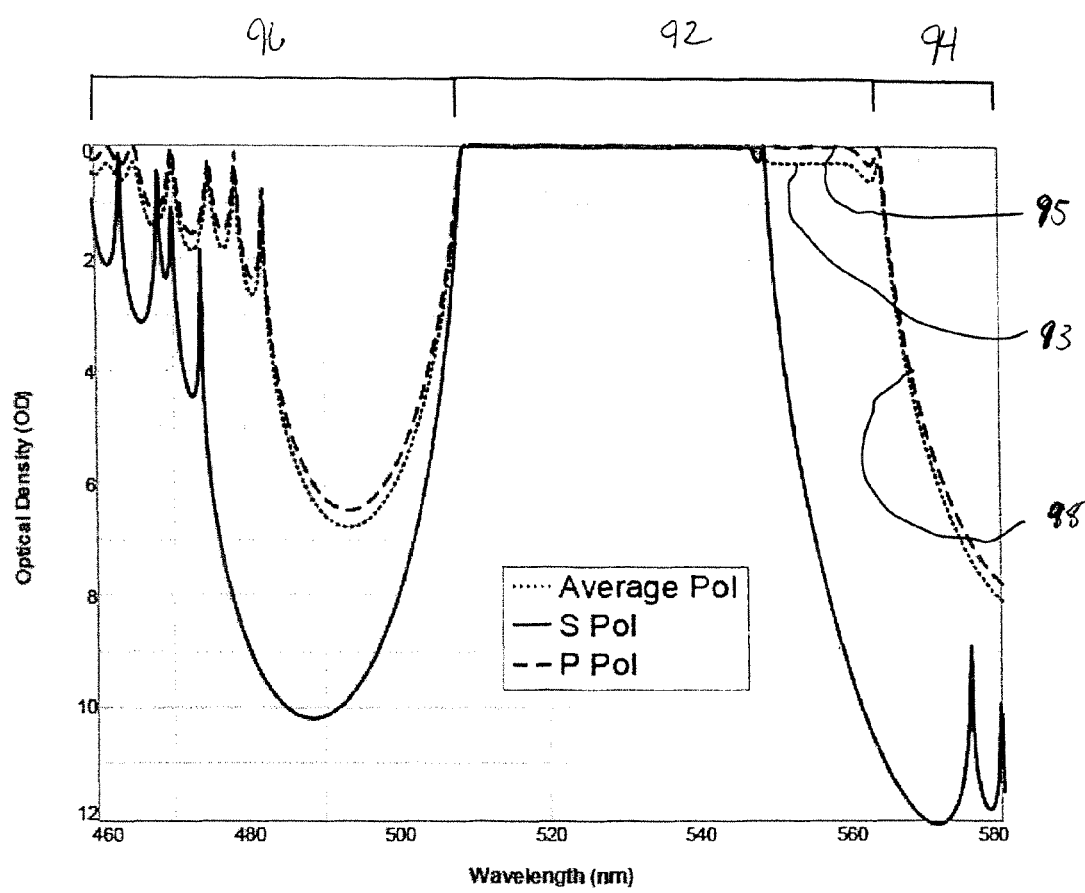
FIG. 8 is a calculated spectrum of a minimal polarization splitting dichroic filter in accordance with the present disclosure.

As a non-limiting example of the basic spectral characteristics of filters according to the present disclosure, reference is made to FIGS. 7 and 8, which plot transmittance vs. wavelength for exemplary dichroic filters that are in accordance with the present disclosure, and which exhibit minimal polarization splitting. As shown in both of these FIGS., these exemplary filters exhibit a spectrum for s-polarized light, a spectrum for p-polarized light, and an average spectrum corresponding to an average of the s and p spectra. Each of these spectra exhibit a passband region 82, 92, a first stopband region 84, 94, and a second stopband region 86, 96. Of course, the location and width of the stopband regions and the passband of the filters according to the present disclosure are not limited to those shown in these FIGS.

As used herein, the term "stopband region," means a range of wavelengths over which transmitted light is strongly attenuated (i.e., transmission is ≤10%) due to interference of the many partial waves of light reflected off of a structure with a periodic or nearly periodic variation of the index of refraction, as found in a thin-film interference filter. In the case of the filters described herein, light that is not transmitted is generally reflected, though blocking by other means (e.g., absorption) is also possible.

The first stopband region 84, 94 and second stopband regions 86, 96 may be centered on any wavelength region of the electromagnetic spectrum, so long as they do not overlap with one another. For example, the first and second stopband regions may encompass distinct wavelength ranges in the 200-1250 nm portion of the electromagnetic spectrum. In some embodiments of the present disclosure, the first and second stopbands are present in the 350-1250 nm range, such as the 350-850 nm range, more specifically the 400-750 nm range.

The second stopband region, such as regions 86, 96, may encompass wavelengths that are shorter or longer than those encompassed by the first stopband region. In some embodiments, the second stopband is placed so as to attenuate and/or block substantially monochromatic light of a given wavelength. For example, the second stopband may be placed so as to block laser light having a wavelength within the 200-1250 nm range of the electromagnetic spectrum. In some non-limiting embodiments, the second stopband is placed so as to attenuate and/or block substantially monochromatic light having a wavelength chosen from 488.0 nm, 514.5 nm, 532.0 nm, 623.8 nm, and 785.0 nm.

Placement of the cut-on edge and/or cut-off edge of the first and/or second stopband regions may be controlled by optimizing the layer thickness of the individual first and second material layers. Thus, for example, filters in accordance with the disclosure may be configured such that an edge wavelength ($\lambda_{EW}$) of at least one of the first and/or second passband region is located at wavelengths that are 2% or less from incident monochromatic light having a wavelength $\lambda_L$. That is, $|\lambda_{EW}-\lambda_L|/\lambda_L*100\%$ may be 2% or less. Of course, $\lambda_{EW}$ may be located closer to or farther from $\lambda_L$, such as ≤1%, and ≤0.5%.

In some embodiments of the present disclosure, the plurality of alternating material layers are configured such that the first stopband region corresponds to a fundamental stopband of the filter, and the second stopband region corresponds to a an odd or even harmonic stopband of the fundamental stopband.

In other non-limiting embodiments, filters in accordance with the present disclosure may be configured such that the first stopband region corresponds to a fundamental stopband of the filter, and the second stopband region corresponds to a non-harmonic stopband region, such as a "passband defect." That is, in these embodiments, the second stopband region encompasses a range of wavelengths that do not correspond to an odd or even harmonic of the fundamental (first) stopband region. For a more specific description of fundamental and harmonic stopbands, reference is made to U.S. Pre-Grant Publication No. 2008-0037129, the contents of which are incorporated herein by reference.

Filters with a passband defect may be created in a variety of ways. As an example, a long-pass dichroic filter based on a passband defect to the short-wavelength side of a fundamental stopband may be obtained from a starting structure correlating to a quarter-wave stack consisting of plurality of alternating first and second material layers having different refractive indexes. The quarter-wave optical thickness is defined with respect to a reference wavelength chosen such that the associated fundamental stopband is above the desired transmitting wavelength region of the target LWP dichroic. The location of the passband defect generally does not coincide with the higher harmonic stopbands associated with the fundamental stopband, and therefore occurs in a region that is transmitting prior to any optimization of layer thickness. Once the starting structure is established, thin-film filter optimization algorithms known in the art may be used to gradually increase the blocking level over the passband defect wavelength region, and then to optimize the layer structure after each increase, until the target blocking level is achieved.

Regardless of whether the second stopband region correlates to a harmonic or non-harmonic stopband of the first stopband region, it is possible through careful control of the configuration of the plurality of alternating first and second material layers to optimize various aspects of the filter spectrum, as described below.

In some non-limiting embodiments, filters according to the present disclosure are configured so as to maximize edge steepness in a region of the filter spectrum corresponding to at least one edge wavelength of the first and/or second stopband regions, particularly when the filter is operated at about 45° Angle of incidence. As used herein, and unless otherwise specifically stated, the term "edge steepness," refers to the relative difference (in percent) of the wavelength of a spectrum of light having average polarization at the 10% transmission point ($\lambda_{10}$) and the 90% transmission point ($\lambda_{90}$) of a long or short wave edge of the first and/or second passband region, relative to a corresponding edge wavelength of the relevant stopband. That is, "edge steepness" (ES) is defined by the expression:

$$ES=(|\lambda_{90}-\lambda_{10}|/\lambda_{EW})*100\%$$

wherein $\lambda_{EW}$ is the corresponding edge wavelength.

Further, as used herein, the term, "corresponding edge wavelength," refers to the cut-on or cut-off frequency of the first or second stopband region for light of average polarization corresponding to the particular edge under consideration. Thus, for example, if the passband region of the filter spectrum encompasses wavelengths longer than the second stopband region such as shown in FIG. 7, $\lambda_{EW}$ refers to the cut-on frequency 87 of the second stopband (the long wave edge of the second stopband), or the cut-off frequency 88 of the first stopband (the short wave edge of the first stopband). The opposite is true if the passband region encompasses wavelengths shorter than said second stopband region. That is, in those cases, "edge wavelength" ($\lambda_{EW}$) refers to the cut-off frequency of the second stopband (i.e., the short wave edge of the second stopband) and the cut-on frequency of the first stopband (the long wave edge of the first stopband), for light of average polarization.

According to some embodiments, filters consistent with the present disclosure have the basic structure described above, and define at least one spectrum having the general features described above when the filter is operated at about 45° Angle of incidence. Moreover, these filters may be configured such that at least one edge of the first and second stopband regions exhibits an edge steepness ranging from ≤0.76%, ≤0.75%, ≤0.65%, ≤0.50%, ≤0.40% ≤0.25%, ≤0.23%, ≤0.17%, and ≤0.10% or less.

In non-limiting embodiments, filters consistent with the present disclosure are configured such that at least one edge of the second stopband region has an edge steepness within the above described ranges, wherein the second stopband region correlates to a harmonic or non-harmonic of the first stopband region. For example, the filters may be configured such that the second stopband region of the filter spectrum exhibits an edge steepness within these ranges, and correlates to a passband defect.

Also in accordance with the present disclosure are interference filters having the basic structure described above, and which exhibit, when the filter is operated at about 45° angle of incidence, at least one filter spectrum having the general features described above. In these non-limiting embodiments, the filters are configured such that at least one of the first and second stopband regions exhibit a defined edge steepness between the optical density 5 and 90% transmission points and/or the optical density 3 and 90% transmission points of the filter spectrum for light of average polarization. For example, filters in accordance with the present disclosure may be configured so as to exhibit an edge steepness, between the optical density 5 and 90% transmission points of least one of the first and second stopband regions, that ranges from about ≤1.82%, ≤1.26%, ≤1.0%, ≤0.75%, ≤0.50%, and ≤0.46% or less, relative to a corresponding edge wavelength. Similarly these filters may be configured such that they exhibit an edge steepness between the optical density 3 and 90% transmission points ranging from about ≤0.76%, ≤0.75%, ≤0.56%, ≤0.50%, ≤0.25%, and ≤0.24% or less, relative to a corresponding edge wavelength.

In non-limiting embodiments, at least one edge of the second stopband region exhibits an edge steepness within these ranges, wherein the second stopband correlates to a harmonic or non-harmonic of the first stopband region.

Figure 9:
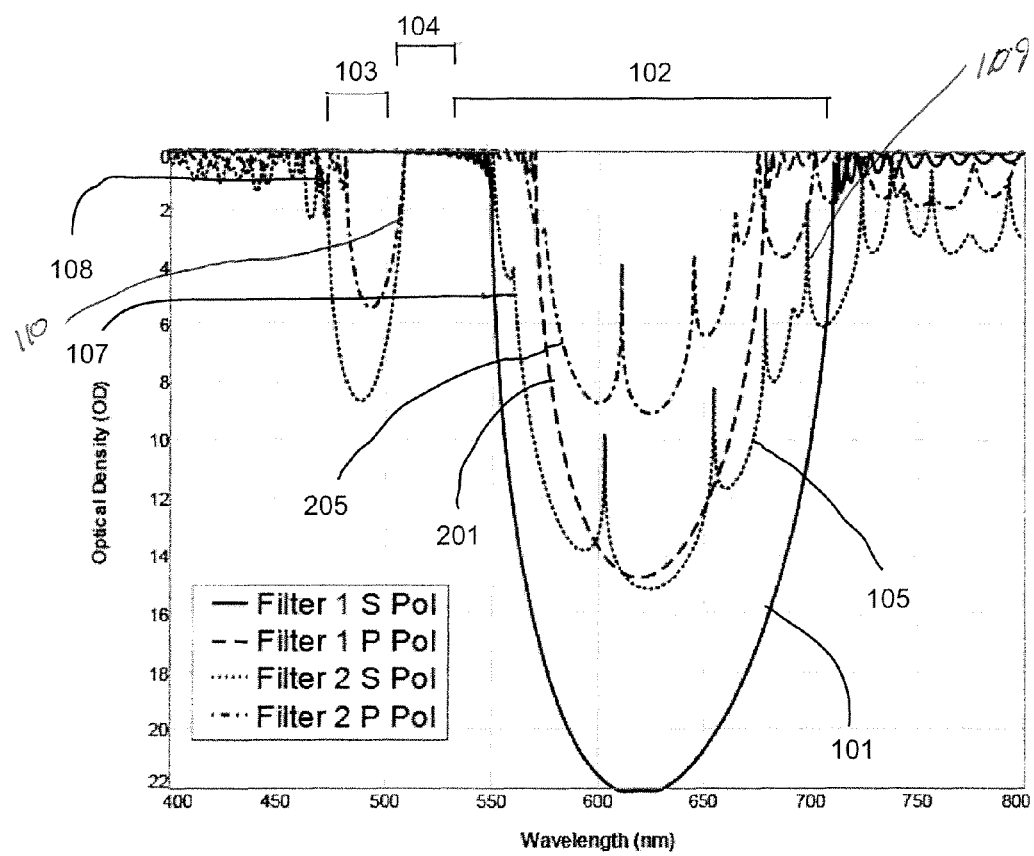
FIG. 9 is a comparison of a dichroic design in accordance with the present disclosure and a traditional angle matched short wave pass filter having comparable coating thickness.

In still other non-limiting embodiments, filters according to the present disclosure may be configured such that the first and second stopband regions each comprise a long wave edge and a short wave edge. For example, as shown in FIG. 9, first stopband 102 and second stopband 103 exhibit short wave edges 107 and 108 respectively, and long wave edges 109 and 110, respectively. Short wave edges 107, 108 have a wavelength (or range of wavelengths) $\lambda_{S1}$ and $\lambda_{S2}$, respectively, and long wave edges 109, 110, have a wavelength (or range of wavelengths) $\lambda_{L1}$ and $\lambda_{L2}$. At least one of long wave edges 109, 110 and short wave edges 107, 108 have an edge steepness, relative to a corresponding edge wavelength, falling within the above described ranges. In a non-limiting embodiment, at least one of short wave edge 107 and long wave edge 110 have an edge steepness falling within the above described ranges.

The plurality of alternating material layers in the filters according to the present disclosure may also be configured so as to optimize polarization splitting exhibited by the filter spectrum.

Thus, consistent with the present disclosure are interference filters having the same basic structure and general spectral characteristics described above. The plurality of alternating material layers of the filter are configured so as to minimize polarization splitting when the filter is operated at about 45° Angle of incidence.

As used herein, the term, "polarization splitting" refers to the difference (in percent) between a wavelength for s-polarized light ($\lambda_{50S}$) and a wavelength for p-polarized light ($\lambda_{50P}$), relative to an average of $\lambda_{50S}$ and $\lambda_{50P}$, wherein $\lambda_{50S}$ and $\lambda_{50P}$ are measured at a 50% transmission point of an edge of a stopband region of the corresponding s and p spectra. That is, polarization splitting (PS) at a given edge of a stopband is defined by the relation:

$$PS=(|\lambda_{50S}-\lambda_{50P}|)/[(\lambda_{50S}=\lambda_{50P})/2]$$

In some embodiments, the filters according to the present disclosure are configured so as to exhibit, when operated at 45° angle of incidence, at least one spectrum including a first stopband region and a second stopband region separated by a passband region, wherein the first or second stopband region of the filter exhibits polarization splitting chosen from about ≤0.50%, ≤0.25%, ≤0.10%, ≤0.039%, ≤0.033%, and ≤0.015% or less. For example, filters according to the present disclosure may be configured such that the first stopband region correlates to a fundamental stopband, the second stopband region correlates to a harmonic of the first stopband, and the second stopband region exhibits polarization splitting within the above described ranges when the filter is operated at about 45° angle of incidence.

In other non-limiting embodiments, filters according to the present disclosure may be configured such that the second stopband region correlates to a non-harmonic stopband (such as a passband defect) of the first stopband region, and the second stopband region exhibits polarization splitting within the above described ranges when the filter is operated at about 45° angle of incidence.

Also consistent with the present disclosure are interference filters that have the same basic structure described above, and which exhibit both low polarization splitting and wide passband bandwidth relative to a corresponding edge wavelength ($\lambda_{EW}$).

As used herein, the term, "passband bandwidth," means the width (in percent) of the passband region separating the first and second stopband regions of the filter spectrum, relative to the corresponding edge wavelength $\lambda_{EW}$ of the second stopband region. Thus, for example, if a passband is present between a longwave edge ($\lambda_{LW2}$) of the second stopband region, and a shortwave edge ($\lambda_{SW1}$) of the first stopband region, the passband bandwidth (PB) is defined by the expression:

$$PB=(|\lambda_{SW1}-\lambda_{LW2}|/\lambda_{Ew})*100\%,$$

where $\lambda_{EW}$ is defined as indicated above for the relevant edge of the second stopband region.

Thus, in some embodiments, filters in accordance with the present disclosure may exhibit, for example, ≤0.5% polarization splitting, such as ≤0.25% polarization splitting, in conjunction with a defined passband bandwidth. For example, filters in accordance with present disclosure may be configured such they exhibit, when operated at about 45° Angle of incidence, polarization splitting within the above described ranges in conjunction with a passband bandwidth ranging from about ≥58.85%, ≥55.97%, ≥50.00%, ≥30.00%, ≥25.00%, ≥23.52%, ≥10.00%, ≥8.06%, ≥7.66%, and ≥5.00%. For example, filters according to the present disclosure may be configured such that the second stopband region exhibits polarization splitting within the above described ranges, and correlates to a harmonic of the first stopband region or a non-harmonic of the first stopband region, such as a passband defect.

The achievable passband bandwidth in filters according to the present disclosure is dependent upon the edge steepness and/or polarization splitting. The steeper the edge or the smaller the polarization splitting, the more difficult it is to achieve a wider passband.

Also consistent with the present disclosure are interference filters having the same general structure described above, and which exhibit extended and/or enhanced blocking in a wavelength range corresponding to at least one of the first and second stopband regions when operated at about 45° Angle of incidence.

Extended blocking about the first and/or second stopband regions may be accomplished by adding additional layer structure to the plurality of alternating material layers present in filters according to the present disclosure. The addition of extended blocking to a complex filter coating is described in detail in U.S. Pat. No. 6,809,859, which is incorporated herein by reference. Similarly, blocking within the first and or second stopband regions of filters according to the present disclosure may be enhanced by depositing additional alternating first and second material layers.

In this way, filters according to the present disclosure may be configured to provide deep blocking of wavelengths within at least one of the first and second stopband regions. That is, filters according to the present disclosure may be configured so as to transmit about ≤10%, ≤5%, ≤1%, or substantially 0% (i.e., optical density 6) of wavelengths falling within at least one of the first and second stopband regions. In non-limiting embodiments, filters according to the present disclosure are configured such that the second stopband region exhibits blocking within the above described ranges, and correlates to a harmonic of the first stopband region or a non-harmonic of the first stopband region, such as a passband defect.

Figure 2:
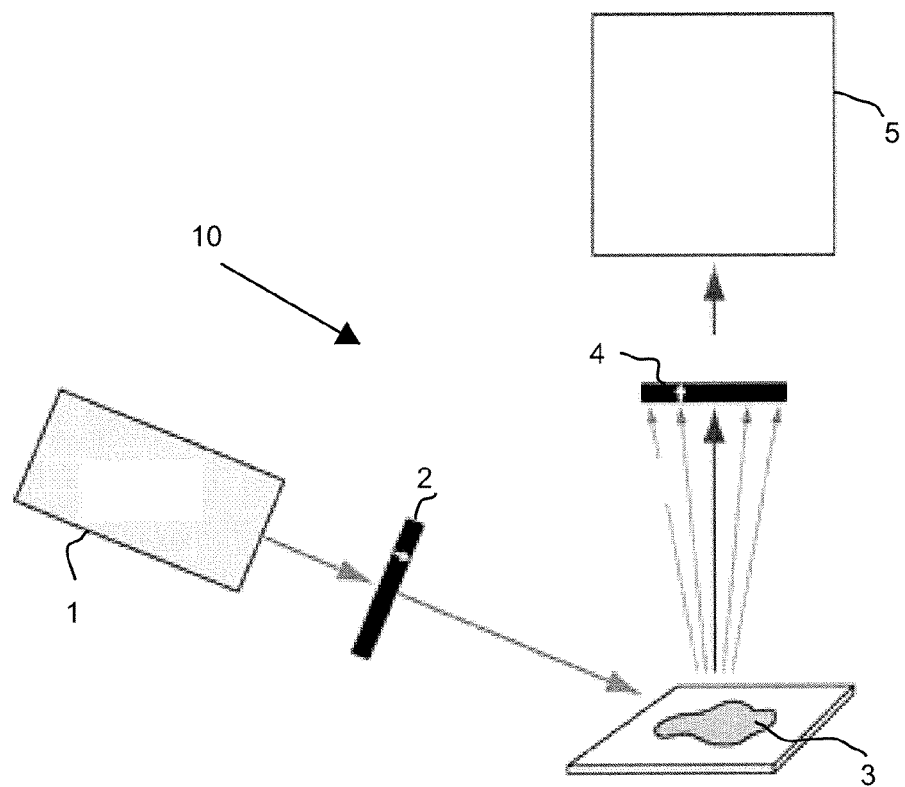
FIG. 2 is a schematic illustration of a Raman spectroscopy system having a standard configuration FIG. 3. is a schematic illustration of a Raman Spectroscopy System having a two-filter configuration.

Filters according to the present disclosure can improve the performance of a variety of optical analysis systems that illuminate/excite a sample with light of a first wavelength (or range of wavelengths) to produce a measurable or viewable response of light at a second wavelength different from the first. Such systems, which include Raman spectroscopy and fluorescence microscopy, typically have the typical construction shown in FIG. 2, or the two-filter construction shown in FIG. 3.

Filters according to the present disclosure may be used in known optical systems in any manner consistent with the use of interference filters known in the art. For example, filters according to the present disclosure may be used in optical systems employing the two filter configuration shown in FIG. 3. As previously described, such a system generally includes a light source 11, such as a laser, an excitation filter 12, a sample 13, a collection filter 14, a detector 15, and a beamsplitter optical filter 16. Beamsplitter optical filter 16 is oriented at non-zero angle of incidence, e.g., about 45°, relative to light incident from light source 11, and is configured to reflect incident light from light source 11 onto sample 13, while transmitting scattered light having a corresponding shift in wavelength (e.g., Raman scattering) returning from Sample 13. Collection filter 14 is used in conjunction with beamsplitter optical filter 16 to ensure complete blocking of incident light that is Rayleigh scattered or reflected from sample 13. Alternatively, beamsplitter optical filter 16 may itself have high blocking at the excitation wavelength, thus obviating the need for the then redundant collection optical filter 14.

Figure 3:
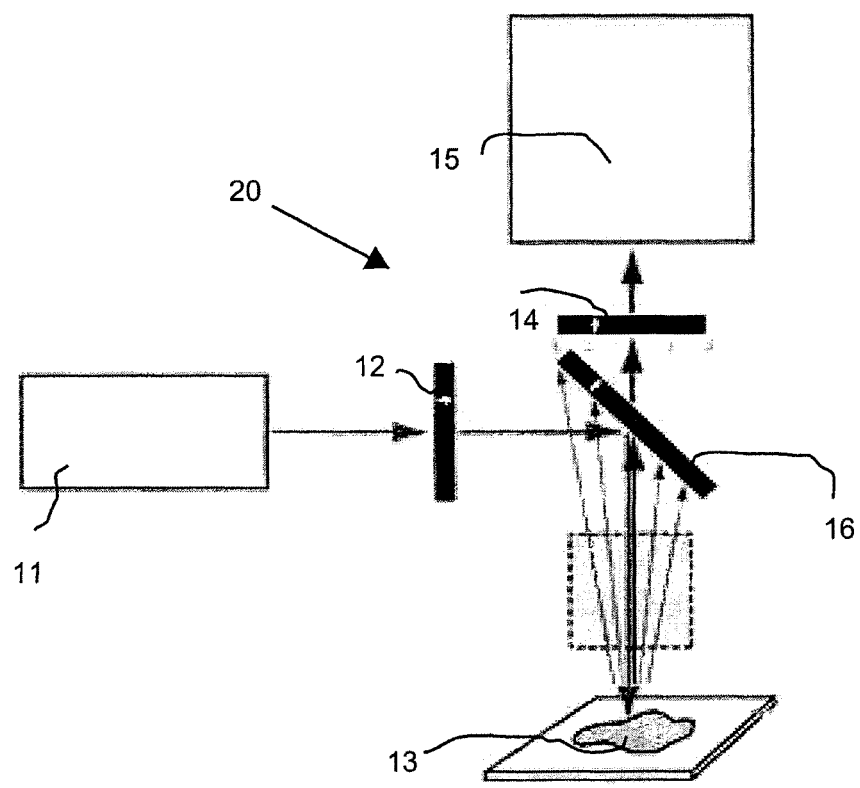
Figure 4A:
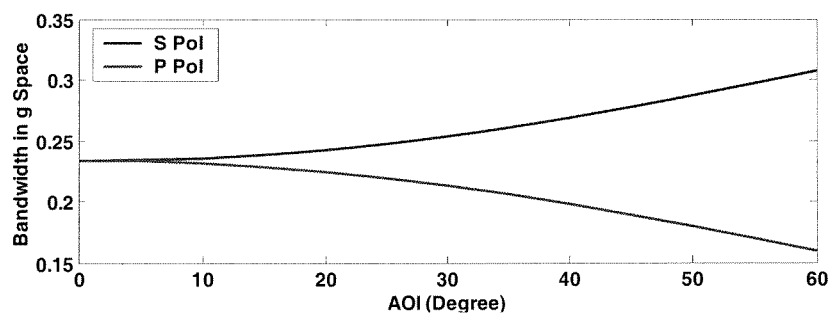
FIG. 4A is a plot of bandwidth in g-space vs. angle of incidence for a traditional quarter wave stack based on $SiO_2$ and $Ta_2O_5$ centered at 500 nm.
Figure 4B:
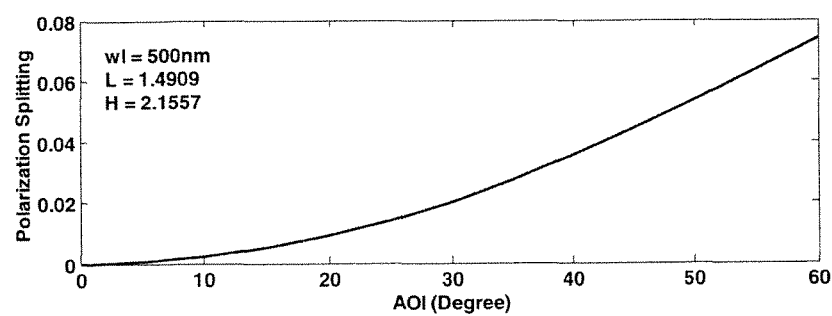
FIG. 4B is a plot of polarization splitting vs. angle of incidence for a traditional quarter wave stack based on $SiO_2$ and $Ta_2O_5$ centered at 500 nm.
Figure 5:
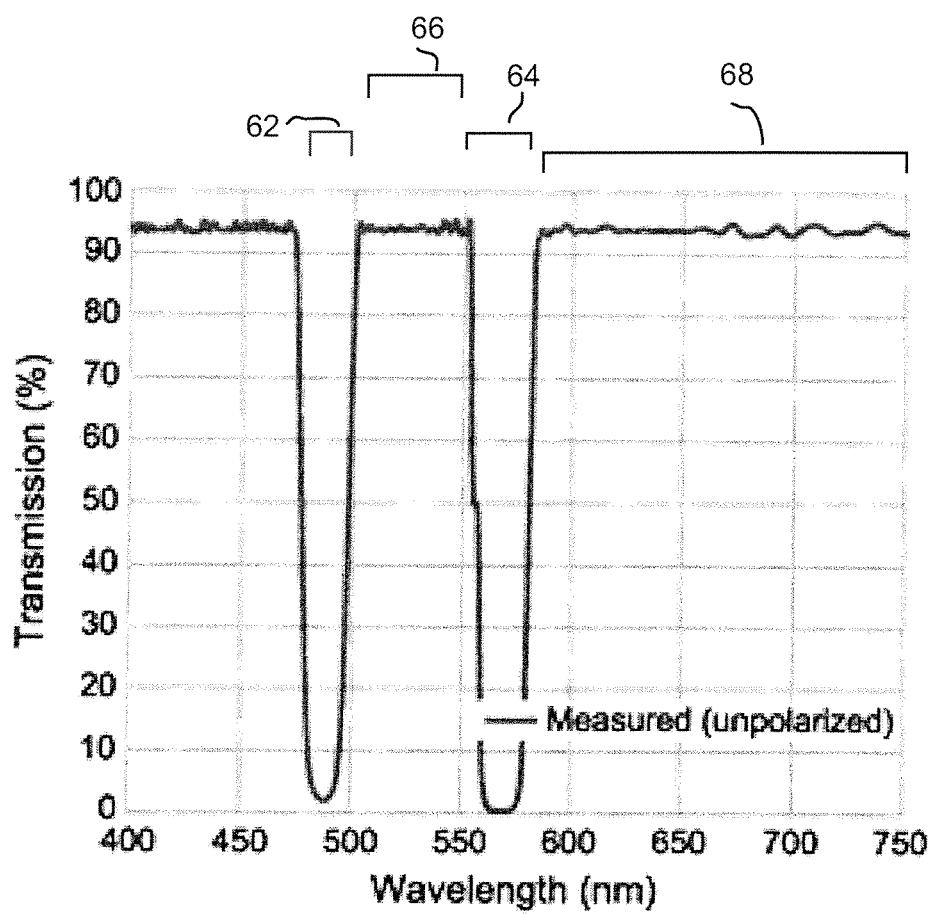
FIG. 5 is a spectrum of light of average polarization passing through a dual notch dichroic beamsplitter.

Filters in accordance with the present disclosure may be used, for example, as beamsplitter optical filter 6 in optical systems of the general two filter configuration shown in FIG. 3. In this case, the alternating first and second material layers may be configured such that when light from the light source impinges on the dichroic beamsplitter optical filter at an angle of incidence of about 45°, the filter defines a spectrum for s-polarized light and a spectrum for p-polarized light, with each spectra defining a first stopband region and a second stopband region separated by a passband region. The layers are also configured such that the dichroic beamsplitter optical filter exhibits at least one of improved polarization splitting, edge steepness, blocking, and passband bandwidth, as described above.

Use of filters according to the present disclosure in such systems allows signals to be measured closer to the wavelength or wavelength region associated with the excitation laser or source, while maintaining necessary high blocking of the source light from the detection system. Thus, in Raman spectroscopy, filters according to the present disclosure allow the measurement of signals closer to the laser line. As a result, vibrational lines with very small energy shifts can be measured, thus providing information about a measured sample that would otherwise be obscured by Rayleigh scattered light. In fluorescence spectroscopy and imaging, the ability to measure signals closer to the source wavelength means that more signal can be captured, thus increasing the sensitivity of the system (ability to measure very small signals) and the specificity of the system (decrease in background noise). Furthermore, filters according to the present disclosure that exhibit enhanced blocking may allow for one or more of the excitation and/or collection filters of the system shown in FIG. 3 to be removed.

The disclosure will be more fully illustrated using the following non-limiting examples.

Other than in the examples, or where otherwise indicated, all numbers expressing endpoints of ranges, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the present disclosure are approximations, unless otherwise indicated the numerical values set forth in the specific examples are reported as precisely as possible. Any numerical value, however, inherently contains certain errors necessarily resulting from the standard deviation found in their respective testing measurements.

EXAMPLES

Examples 1 and 2

Minimal Polarization Splitting, Long Wave Pass Steep Edge Dichroic Filter Configurations Based on the Concept of Passband Defect A filter design corresponding to minimal polarization long wave pass steep edge dichroic filter based on the concept of passband defect was produced by optimizing a traditional dichroic short wave pass (SWP) filter spectrum and structure against a design spectrum using well-known optimization algorithms (e.g., the variable metric approach). That is, this design was optimized starting from a dichroic SWP filter comprising a substrate and approximately 150 alternating quarter wavelength thick layers of materials having high and low refractive index at a reference wavelength, respectively, and in view of a target (design) spectrum having desired spectral characteristics.

In the design spectrum, the edge of the SWP was chosen to be slightly longer than a specified long wavelength edge of the dichroic passband. The passband ripple of the design spectrum was optimized. After optimizing the passband ripple, the optimization continued while the blocking level just below the cut-on wavelength of the passband defect was gradually increased.

The spectra of this filter design was calculated at 45° angle of incidence. These calculated spectra are shown in FIG. 7. As shown, this filter design exhibits average spectrum 83, s-spectrum 84, p-spectrum 85, a first stopband region 84 above about 560 nm, a second non-harmonic stopband region 86 ranging from about 450 to 508 nm, and a passband region 82 between the first and second stopband regions 84, 86. Moreover, the second stopband 86 region exhibits minimal polarization splitting (0.039%, or less than 0.2 nm) at its long wave edge 87.

The calculated s and p spectra of example filter 1 were compared to the spectra of a comparative filter (comparative example 1) that exhibited only a fundamental stopband, and no passband defect. This comparison is shown in FIG. 9. In this FIG., spectra 105 and 205 correlate to the spectra for s-polarized and p-polarized light, respectively, of example filter 1 (identified as "Filter 2" in the figure legend). Spectra 101 and 201 correlate to the spectra for s-polarized and p-polarized light, respectively, of the comparative filter (identified as "Filter 1" in the figure legend). As shown, example filter 1 exhibited spectral characteristics similar to those of the comparative filter, except that the filter of example 1 exhibited a passband defect to the short-wavelength side of the fundamental stopband.

The calculated edge steepness and polarization splitting of the filter of example 1 was also compared to those of a commercially available standard dichroic filter known in the art, i.e., the filter manufactured by Semrock, Inc. under part number FF506-Di02. The resulting data is reproduced in the table below.

TABLE 1

Comparison of a filter design in accordance with the present disclosure and a conventional dichroic filter design:

| | Coating Thickness | Average Polarization | | | Edge Steepness | S-Pol | P-Pol | Polarization Splitting |
|---|---|---|---|---|---|---|---|---|
| | | 2% | 10% | 90% | | 50% | 50% | |
| Comparative example 1 | 7.7 | 504.4 | 507.2 | 510.9 | 3.7 | 510.5 | 508.6 | 1.9 |
| example 1 | 12.1 | 506.9 | 507.7 | 508.8 | 1.1 | 508.4 | 508.3 | 0.2 |

* Edge Steepness is defined as the transition width between 10% and 90% transmission levels.

As shown, the filter of example 1 exhibited significantly better edge steepness and polarization splitting, relative to comparative example 1.

Figure 6:
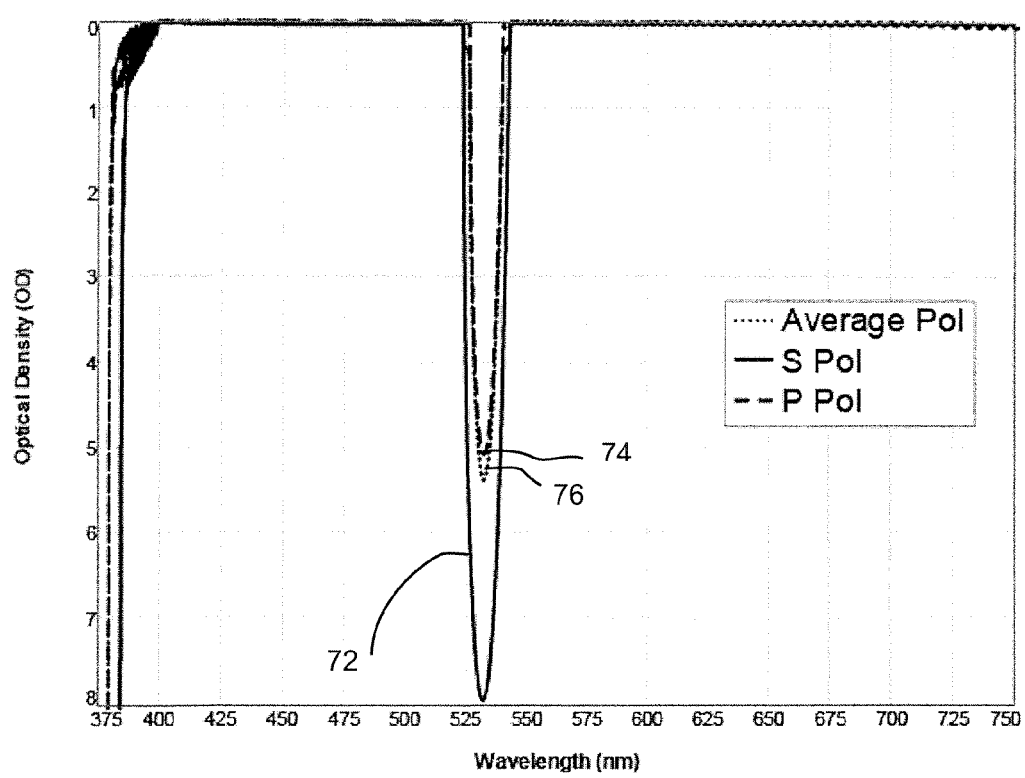
FIG. 6 is a design spectrum of an angle matched notch filter measured at 45° angle of incidence

A second filter design (example 2) similar to example filter 1 above was also produced. The calculated average spectrum for this design (FIG. 8) was compared to the spectrum of the standard angle-matched notch filter shown in FIG. 6. While the calculated spectra for the filter of example 2 exhibited relatively limited bandwidth compared to that of the notch filter, as shown in the following table, it achieves better edge steepness for unpolarized light, and comparable edge steepness for s-polarized light with a coating thickness less than half that of the notch filter.

TABLE 2 comparison of a second filter design in accordance with the present disclosure and a conventional notch filter:

| | Coating Thickness | Average Polarization | | | S Polarization | | |
|---|---|---|---|---|---|---|---|
| | ($\mu$) | OD 5 | 90% | ES | OD 5 | 90% | ES |
| Example 2 | 13.4 | 502.5 | 508.8 | 6.3 | 505.0 | 508.8 | 3.8 |
| Comparative example 2 (notch filter) | 31.5 | 534.4 | 541.9 | 7.5 | 538.9 | 542.0 | 3.1 |

* Edge Steepness is defined as the transition width between OD 5 and 90% transmission level Examples 3 and 4

532 nm Steep Dichroic Beamsplitter

A first 532 nm dichroic beamsplitter optical filter (example 3) was produced having the configuration shown in the following table:

TABLE 3

Design structure of a 532 nm steep dichroic beamsplitter
532 nm Steep Dichroic Beamsplitter
Coating Thickness ($\mu$m): 14.572006282
Total Layers: 92

| Layer | Material | Thickness (nm) |
|---|---|---|
| 1 | Nb2O5 | 15.76397 |
| 2 | SiO2 | 299.964436 |
| 3 | Nb2O5 | 140.250246 |
| 4 | SiO2 | 191.877075 |
| 5 | Nb2O5 | 127.915529 |
| 6 | SiO2 | 182.984338 |
| 7 | Nb2O5 | 127.387605 |
| 8 | SiO2 | 179.120336 |
| 9 | Nb2O5 | 127.717542 |

TABLE 3-continued

Design structure of a 532 nm steep dichroic beamsplitter
532 nm Steep Dichroic Beamsplitter
Coating Thickness (μm): 14.572006282
Total Layers: 92

| Layer | Material | Thickness (nm) |
|---|---|---|
| 10 | SiO2 | 175.632888 |
| 11 | Nb2O5 | 128.592224 |
| 12 | SiO2 | 176.380586 |
| 13 | Nb2O5 | 128.373916 |
| 14 | SiO2 | 178.887283 |
| 15 | Nb2O5 | 127.769399 |
| 16 | SiO2 | 184.194878 |
| 17 | Nb2O5 | 127.93426 |
| 18 | SiO2 | 188.227308 |
| 19 | Nb2O5 | 128.005756 |
| 20 | SiO2 | 188.057134 |
| 21 | Nb2O5 | 127.918216 |
| 22 | SiO2 | 184.475321 |
| 23 | Nb2O5 | 128.072983 |
| 24 | SiO2 | 179.425546 |
| 25 | Nb2O5 | 128.141557 |
| 26 | SiO2 | 176.964355 |
| 27 | Nb2O5 | 127.96974 |
| 28 | SiO2 | 177.506078 |
| 29 | Nb2O5 | 126.511604 |
| 30 | SiO2 | 178.33606 |
| 31 | Nb2O5 | 122.577018 |
| 32 | SiO2 | 184.039011 |
| 33 | Nb2O5 | 117.335837 |
| 34 | SiO2 | 194.189076 |
| 35 | Nb2O5 | 112.228887 |
| 36 | SiO2 | 203.60499 |
| 37 | Nb2O5 | 106.362721 |
| 38 | SiO2 | 211.476307 |
| 39 | Nb2O5 | 104.05433 |
| 40 | SiO2 | 216.082874 |
| 41 | Nb2O5 | 104.97781 |
| 42 | SiO2 | 216.022612 |
| 43 | Nb2O5 | 105.579945 |
| 44 | SiO2 | 215.384734 |
| 45 | Nb2O5 | 109.206235 |
| 46 | SiO2 | 216.710917 |
| 47 | Nb2O5 | 112.573883 |
| 48 | SiO2 | 215.791662 |
| 49 | Nb2O5 | 111.467447 |
| 50 | SiO2 | 214.359317 |
| 51 | Nb2O5 | 112.161114 |
| 52 | SiO2 | 215.045267 |
| 53 | Nb2O5 | 111.2683 |
| 54 | SiO2 | 213.279207 |
| 55 | Nb2O5 | 110.267674 |
| 56 | SiO2 | 214.458176 |
| 57 | Nb2O5 | 111.006435 |
| 58 | SiO2 | 215.231417 |
| 59 | Nb2O5 | 110.245668 |
| 60 | SiO2 | 214.169518 |
| 61 | Nb2O5 | 111.027028 |
| 62 | SiO2 | 214.34487 |
| 63 | Nb2O5 | 111.673756 |
| 64 | SiO2 | 214.244813 |
| 65 | Nb2O5 | 111.079041 |
| 66 | SiO2 | 213.789538 |
| 67 | Nb2O5 | 112.533959 |
| 68 | SiO2 | 214.210094 |
| 69 | Nb2O5 | 112.724502 |
| 70 | SiO2 | 214.10514 |
| 71 | Nb2O5 | 111.816605 |
| 72 | SiO2 | 214.903751 |
| 73 | Nb2O5 | 111.375223 |
| 74 | SiO2 | 216.600697 |
| 75 | Nb2O5 | 108.409546 |
| 76 | SiO2 | 217.075285 |
| 77 | Nb2O5 | 105.631166 |
| 78 | SiO2 | 219.15066 |
| 79 | Nb2O5 | 104.675816 |
| 80 | SiO2 | 221.358226 |
| 81 | Nb2O5 | 100.306396 |
| 82 | SiO2 | 221.855185 |
| 83 | Nb2O5 | 96.432497 |
| 84 | SiO2 | 219.84993 |
| 85 | Nb2O5 | 101.481757 |
| 86 | SiO2 | 217.432062 |
| 87 | Nb2O5 | 108.404809 |
| 88 | SiO2 | 213.890199 |
| 89 | Nb2O5 | 111.04977 |
| 90 | SiO2 | 217.589309 |
| 91 | Nb2O5 | 106.544147 |
| 92 | SiO2 | 114.923947 |

Figure 10:
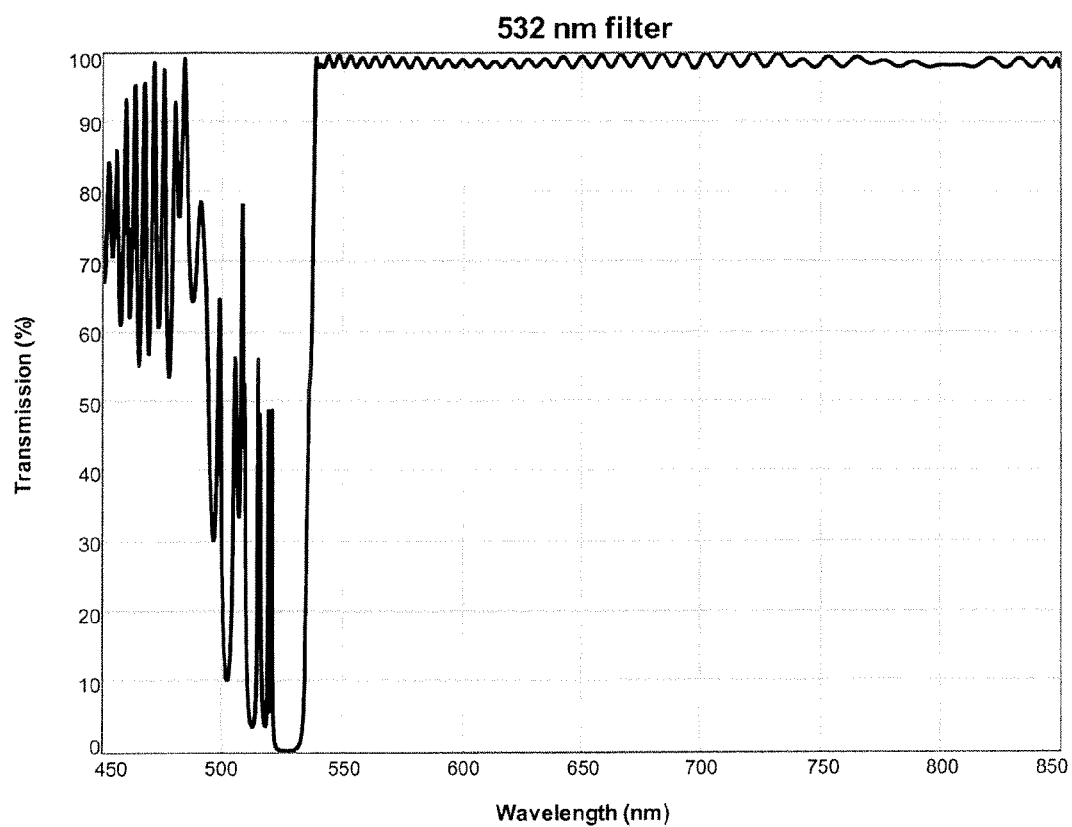
FIG. 10 is a design spectrum of a 532 nm steep dichroic beamsplitter in accordance with the present disclosure.
Figure 11:
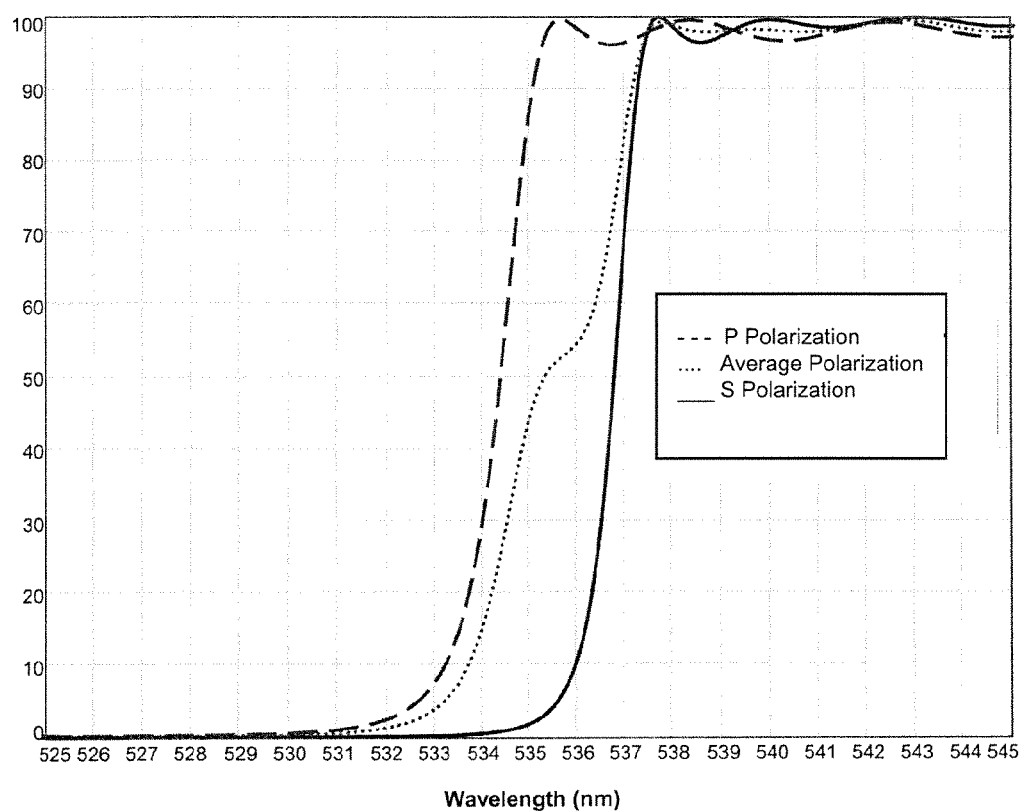
FIG. 11 is a magnified portion of a design spectrum of a 532 nm steep dichroic beamsplitter in accordance with the present disclosure.

The design for this filter was produced by optimizing a standard dichroic filter comprising alternating quarter wavelength thick layers of $SiO_2$ and $Nb_2O_5$ against the target spectra shown in FIGS. 10 and 11.

Figure 12:
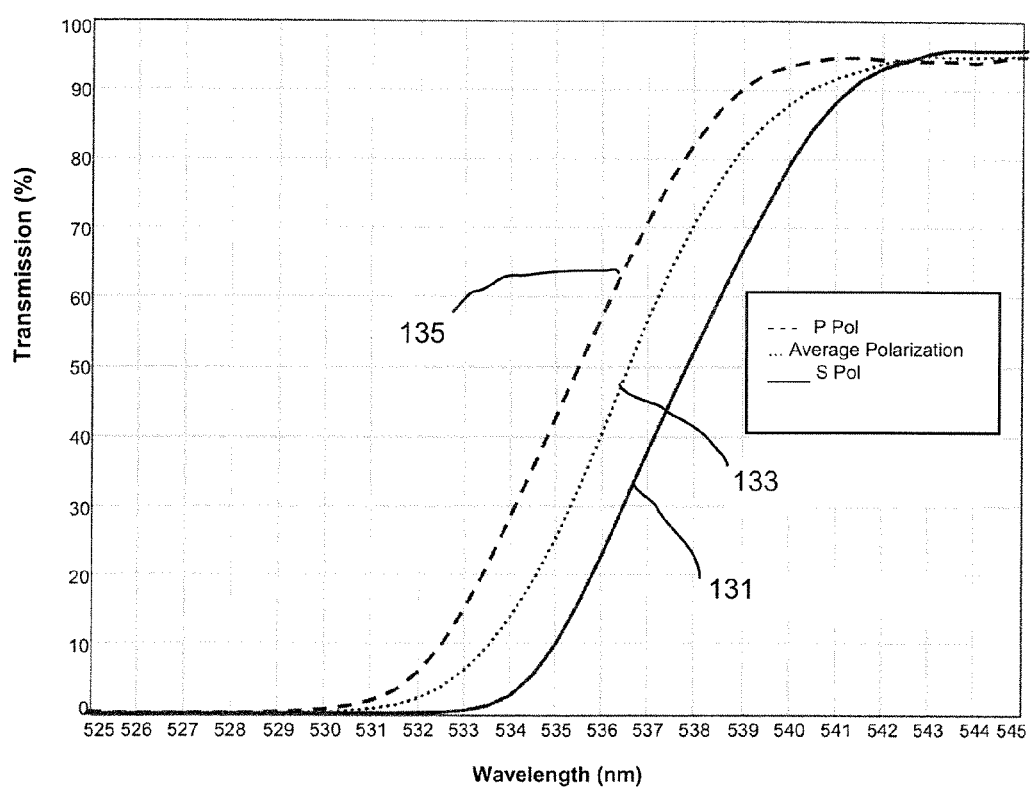
FIG. 12 is a magnified portion of a measured spectrum of a 532 nm steep dichroic beamsplitter in accordance with the present disclosure.

The filter configuration was physically produced using a computer controlled ion-beam deposition system, such as the one described in U.S. Pat. No. 7,068,430. The resulting filter was measured at 45° Angle of incidence using a Perkin Elmer Lambda 900 spectrophotometer with a 2-degree cone-half-angle beam at the filter. A magnified portion of the measured spectra 131, 133, 135 is shown in FIG. 12. As shown, average spectrum 133 exhibited a non-harmonic second stopband region having long wave edge at about 536 nm. This edge had an edge steepness (10%-90% T) for light of average polarization of 0.65%, relative to the edge wavelength. Furthermore, polarization splitting at the 50% transmission point for this edge was 0.45%. The filter also exhibited a fundamental stopband having a short wave edge around 850 nm (not shown in FIG. 12). The passband bandwidth was 58.9%, relative to the long wave edge of the non-harmonic second stopband region.

Figure 13:
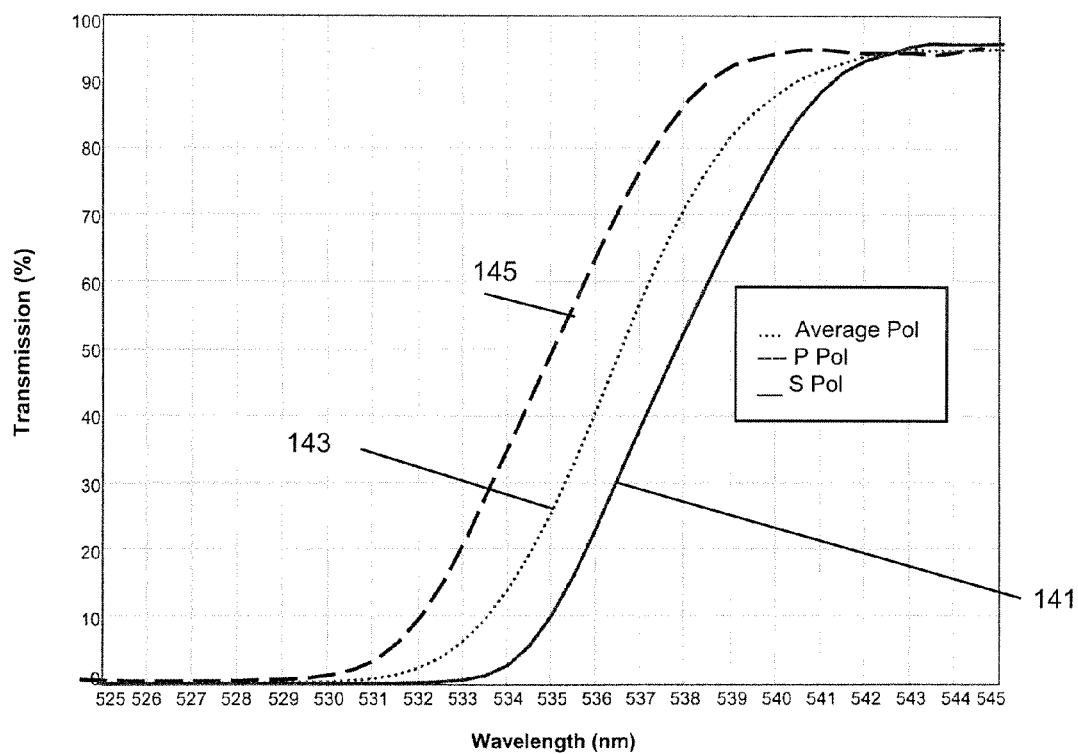
FIG. 13 is a simulation of a measured spectrum of a 532 nm steep dichroic beamsplitter, using a 2-degree cone-half angle beam at the filter.

Spectra 131, 133, and 135 shown in FIG. 12 did not precisely correlate to the design spectra shown in FIG. 11. To clarify this issue, simulated spectra 141, 143, 145 (shown in FIG. 13) of a 532 nm steep dichroic beamsplitter were plotted using a 2-degree cone-half-angle beam at the filter. The simulated spectra of FIG. 13 closely correlated to the measured spectra of FIG. 12. Thus, the simulated spectra demonstrated that the disagreement between the measured spectra in FIG. 12 and the design spectra in FIG. 11 was dominated by the non-collimated nature of the spectrophotometer beam.

An additional 532 nm steep dichroic beamsplitter (example 4) was produced largely in accordance with the design of example 3, but had a total coating thickness of about 14.3 μm. This filter was then compared to the filter of example 3, so as to investigate the impact of coating thickness on edge steepness. The data obtained is reproduced in the following table.

TABLE 4

Dependence of coating thickness on edge steepness for 532 nm dichroic beamsplitters:

| | Thickness (μm) | CHA (Deg) | 1% | 2% | 5% | 10% | 50% | 90% | Edge Steepness | | | |
|---|---|---|---|---|---|---|---|---|---|---|---|---|
| | | | | | | | | | 1%-50% | 2%-50% | 5%-50% | 10%-50% |
| Ex. 3 | 14.6 | 0.00 | 531.77 | 532.45 | 533.20 | 533.70 | 535.32 | 537.16 | 0.67% | 00.54% | 0.40% | 0.29% |
| Ex. 4 | 14.3 | 0.00 | 530.24 | 531.47 | 532.60 | 533.28 | 534.85 | 535.72 | 0.87% | 0.63% | 0.42% | 0.29% |

As shown, as coating thickness is increased, the value of edge steepness decreased over all indicated transmission ranges. That is, the 532 nm filter having a coating thickness of about 14.6 μm exhibited better edge steepness than a filter having a similar design having a coating thickness of about 14.3 μm

Examples 5-7

785 nm Steep Dichroic Beamsplitter

A 785 nm dichroic beamsplitter optical filter design was produced having the configuration shown in the following table.

TABLE 5 structure of a 785 nm dichroic beamsplitter
785 nm Steep Dichroic Beamsplitter
Coating Thickness (μm): 22.027679258
Total Layers: 102

| Layer | Material | Thickness (nm) |
|---|---|---|
| 1 | Nb2O5 | 32.65508 |
| 2 | SiO2 | 144.868199 |
| 3 | Nb2O5 | 47.804313 |
| 4 | SiO2 | 128.394549 |
| 5 | Nb2O5 | 238.282792 |
| 6 | SiO2 | 278.529226 |
| 7 | Nb2O5 | 205.569093 |
| 8 | SiO2 | 192.698961 |
| 9 | Nb2O5 | 213.370004 |
| 10 | SiO2 | 229.798324 |
| 11 | Nb2O5 | 202.31804 |
| 12 | SiO2 | 229.540528 |
| 13 | Nb2O5 | 188.952969 |
| 14 | SiO2 | 264.186477 |
| 15 | Nb2O5 | 166.668797 |
| 16 | SiO2 | 298.763611 |
| 17 | Nb2O5 | 151.800937 |
| 18 | SiO2 | 306.540671 |
| 19 | Nb2O5 | 153.743939 |
| 20 | SiO2 | 292.519538 |
| 21 | Nb2O5 | 167.77654 |
| 22 | SiO2 | 265.665013 |
| 23 | Nb2O5 | 181.805452 |
| 24 | SiO2 | 248.085954 |
| 25 | Nb2O5 | 186.587916 |
| 26 | SiO2 | 257.083035 |
| 27 | Nb2O5 | 173.731249 |
| 28 | SiO2 | 282.190763 |
| 29 | Nb2O5 | 159.397771 |
| 30 | SiO2 | 300.391953 |
| 31 | Nb2O5 | 150.96526 |
| 32 | SiO2 | 297.936495 |
| 33 | Nb2O5 | 162.276647 |
| 34 | SiO2 | 278.171719 |
| 35 | Nb2O5 | 176.668889 |
| 36 | SiO2 | 253.863045 |
| 37 | Nb2O5 | 184.792068 |
| 38 | SiO2 | 254.299535 |
| 39 | Nb2O5 | 177.746861 |
| 40 | SiO2 | 272.711789 |

TABLE 5-continued structure of a 785 nm dichroic beamsplitter
785 nm Steep Dichroic Beamsplitter
Coating Thickness (μm): 22.027679258
Total Layers: 102

| Layer | Material | Thickness (nm) |
|---|---|---|
| 41 | Nb2O5 | 163.373578 |
| 42 | SiO2 | 296.233849 |
| 43 | Nb2O5 | 153.524699 |
| 44 | SiO2 | 299.382853 |
| 45 | Nb2O5 | 158.508489 |
| 46 | SiO2 | 281.140846 |
| 47 | Nb2O5 | 174.034337 |
| 48 | SiO2 | 258.219413 |
| 49 | Nb2O5 | 182.515237 |
| 50 | SiO2 | 252.516009 |
| 51 | Nb2O5 | 180.195999 |
| 52 | SiO2 | 270.147819 |
| 53 | Nb2O5 | 165.079108 |
| 54 | SiO2 | 292.635319 |
| 55 | Nb2O5 | 154.092521 |
| 56 | SiO2 | 300.457145 |
| 57 | Nb2O5 | 157.556848 |
| 58 | SiO2 | 283.249826 |
| 59 | Nb2O5 | 170.688922 |
| 60 | SiO2 | 263.521222 |
| 61 | Nb2O5 | 182.754251 |
| 62 | SiO2 | 250.831796 |
| 63 | Nb2O5 | 180.190883 |
| 64 | SiO2 | 267.736417 |
| 65 | Nb2O5 | 168.130035 |
| 66 | SiO2 | 289.992505 |
| 67 | Nb2O5 | 154.816559 |
| 68 | SiO2 | 301.48422 |
| 69 | Nb2O5 | 156.252091 |
| 70 | SiO2 | 292.362158 |
| 71 | Nb2O5 | 167.902499 |
| 72 | SiO2 | 267.994834 |
| 73 | Nb2O5 | 182.180612 |
| 74 | SiO2 | 256.094057 |
| 75 | Nb2O5 | 185.837901 |
| 76 | SiO2 | 256.023623 |
| 77 | Nb2O5 | 182.259064 |
| 78 | SiO2 | 275.674377 |
| 79 | Nb2O5 | 172.851921 |
| 80 | SiO2 | 293.233127 |
| 81 | Nb2O5 | 167.346137 |
| 82 | SiO2 | 309.467491 |
| 83 | Nb2O5 | 166.563984 |
| 84 | SiO2 | 315.796872 |
| 85 | Nb2O5 | 168.81202 |
| 86 | SiO2 | 317.38589 |
| 87 | Nb2O5 | 166.46106 |
| 88 | SiO2 | 318.205316 |
| 89 | Nb2O5 | 166.733122 |
| 90 | SiO2 | 321.459683 |
| 91 | Nb2O5 | 165.490765 |
| 92 | SiO2 | 324.579443 |
| 93 | Nb2O5 | 163.747759 |
| 94 | SiO2 | 314.956531 |
| 95 | Nb2O5 | 162.072937 |
| 96 | SiO2 | 322.030717 |
| 97 | Nb2O5 | 168.63477 |
| 98 | SiO2 | 359.00252 |

TABLE 5-continued structure of a 785 nm dichroic beamsplitter
785 nm Steep Dichroic Beamsplitter
Coating Thickness (μm): 22.027679258
Total Layers: 102

| Layer | Material | Thickness (nm) |
|---|---|---|
| 99 | Nb2O5 | 101.921796 |
| 100 | SiO2 | 91.621751 |
| 101 | Nb2O5 | 14.838899 |
| 102 | SiO2 | 79.718824 |

Figure 14:
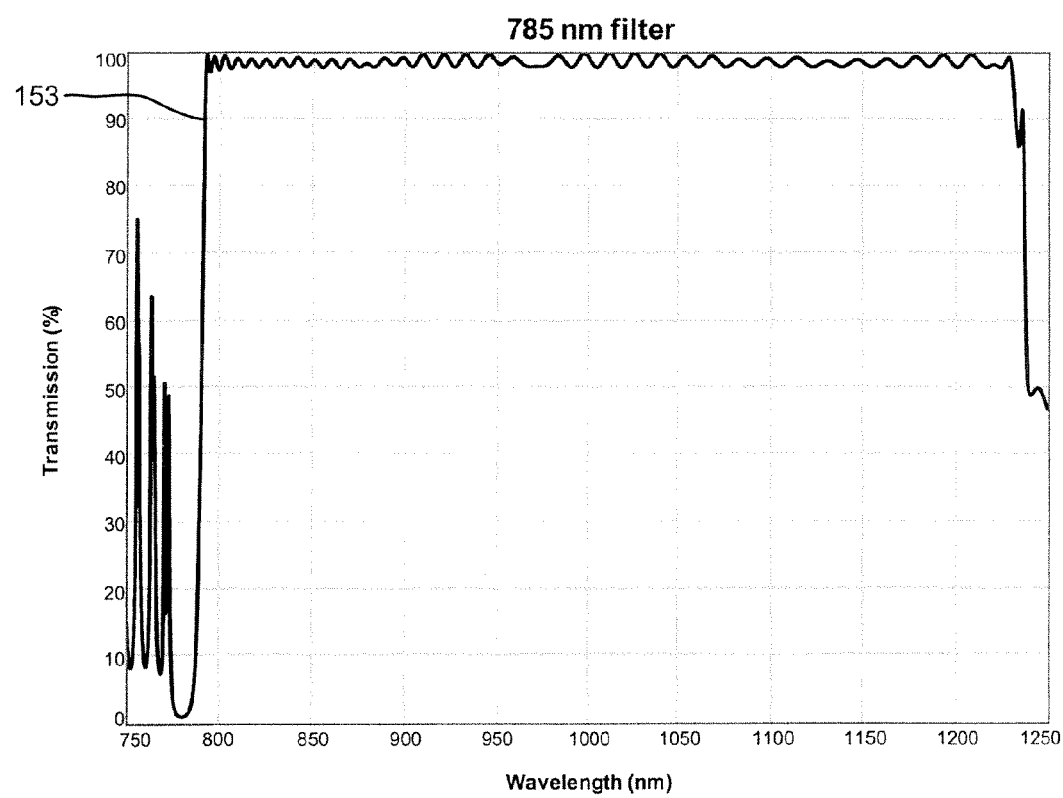
FIG. 14 is a design spectrum of a 785 nm steep dichroic beam splitter in accordance with the present disclosure.
Figure 15:
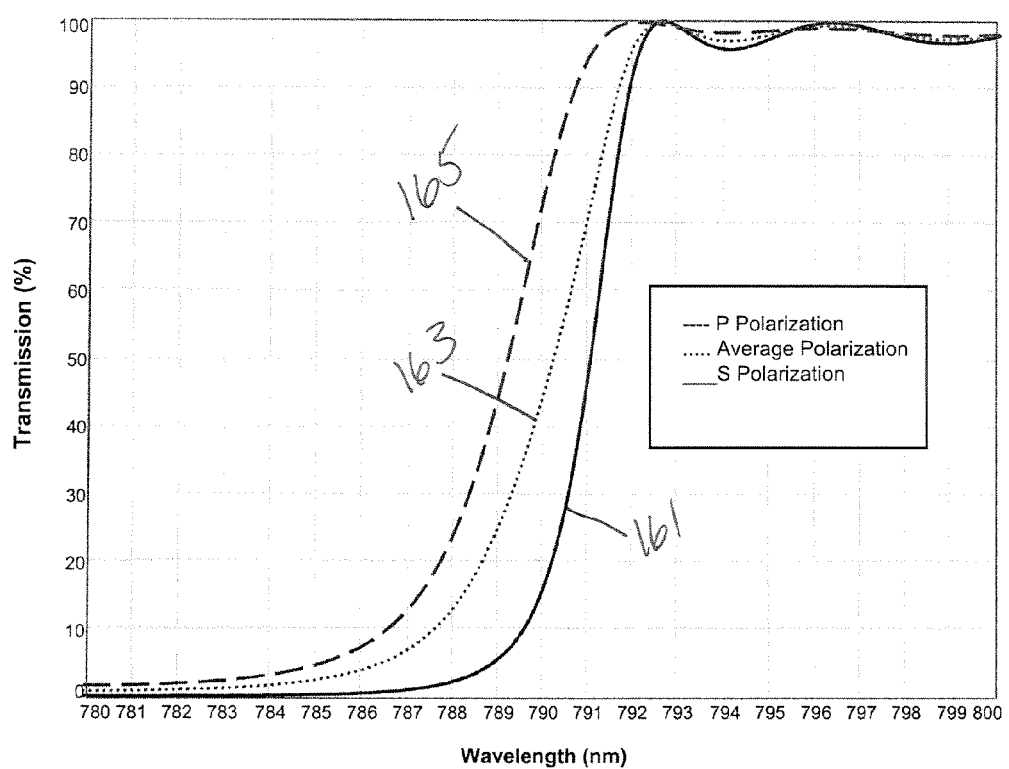
FIG. 15 is a magnified portion of a design spectrum of a 785 nm steep dichroic beam splitter in accordance with the present disclosure.

Like examples 3 and 4 above, the design for the filter of example 5 was produced by optimizing a standard dichroic filter comprising alternating quarter wavelength thick layers of $SiO_2$ and $Nb_2O_5$. However, in this case, the basic structure and spectra were optimized against the target spectra 153, 161, 163, 165 shown in FIGS. 14 and 15.

The resulting filter exhibited spectral characteristics, when measured at 45° Angle of incidence, largely consistent with the target spectra. That is, this filter exhibited a fundamental stopband region having a short wave edge around 1240-1250 nm, and a non-harmonic second stopband region below about 780 nm. A bandpass region separated the fundamental stopband region and the non-harmonic second stopband region. The bandpass bandwidth was about 56%, relative to the long wave edge of the non-harmonic second stopband region. the edge steepness at the long wave edge of the non-harmonic stopband was 0.24%. the edge steepness (10%-90% T) at the long wave edge of the non-harmonic stopband was 0.52%.

Further, like examples 3 and 4, multiple filters in accordance with this design were designed having different overall coating thicknesses. The design spectra were compared and the resulting data is provided in the following table:

TABLE 6

Dependence of coating thickness on edge steepness for 785 nm dichroic beamsplitters:

| | Thickness (μm) | CHA (Deg) | 1% | 2% | 5% | 10% | 50% | 90% | 1%-50% | 2%-50% | 5%-50% | 10%-50% |
|---|---|---|---|---|---|---|---|---|---|---|---|---|
| Ex. 5 | 22.0 | 0.00 | | 784.33 | 786.40 | 787.57 | 790.22 | 791.67 | | 0.74% | 0.48% | 0.34% |
| Ex. 6 | 21.5 | 0.00 | | 783.33 | 785.65 | 786.91 | 789.51 | 790.85 | | 0.79% | 0.49% | 0.33% |
| Ex. 7 | 28.4 | 0.00 | 784.32 | 785.65 | 786.91 | 787.69 | 789.55 | 790.76 | 0.66% | 0.50% | 0.33% | 0.24% |
| | | 0.25 | | 784.35 | 786.36 | 787.53 | 790.21 | 791.74 | | 0.74% | 0.49% | 0.34% |
| | | 0.50 | | 784.24 | 786.24 | 787.41 | 790.16 | 791.93 | | 0.75% | 0.50% | 0.35% |
| | | 1.00 | | 783.84 | 785.79 | 786.97 | 790.03 | 792.62 | | 0.79% | 0.54% | 0.39% |

Example 7

Deeply Blocking, Steep 532 Nm Beamsplitter Design

A design for a deeply blocking, steep 532 nm beamsplitter for 45° Angle of incidence spectroscopy was designed having the configuration shown in the following table.

TABLE 7 design structure of a steep 532 nm
beamsplitter for 45° Angle of incidence:
532 nm Deeply Blocking Steep Beamsplitter
Coating Thickness (μm): 28.441678135

Total Layers: 240

| Layer | Material | Thickness (nm) |
|---|---|---|
| 1 | Nb2O5 | 125.326398 |
| 2 | SiO2 | 189.82584 |
| 3 | Nb2O5 | 142.239469 |
| 4 | SiO2 | 173.603106 |
| 5 | Nb2O5 | 117.551329 |
| 6 | SiO2 | 133.761606 |
| 7 | Nb2O5 | 80.048395 |
| 8 | SiO2 | 176.142504 |
| 9 | Nb2O5 | 94.522896 |
| 10 | SiO2 | 130.594691 |
| 11 | Nb2O5 | 79.110445 |
| 12 | SiO2 | 171.423982 |
| 13 | Nb2O5 | 95.099021 |
| 14 | SiO2 | 130.08483 |
| 15 | Nb2O5 | 78.427458 |
| 16 | SiO2 | 166.362706 |
| 17 | Nb2O5 | 98.106453 |
| 18 | SiO2 | 132.199068 |
| 19 | Nb2O5 | 77.000752 |
| 20 | SiO2 | 157.603991 |
| 21 | Nb2O5 | 101.809349 |
| 22 | SiO2 | 136.519889 |
| 23 | Nb2O5 | 76.525829 |
| 24 | SiO2 | 149.287636 |
| 25 | Nb2O5 | 103.878664 |
| 26 | SiO2 | 141.700953 |
| 27 | Nb2O5 | 76.171685 |
| 28 | SiO2 | 141.748625 |
| 29 | Nb2O5 | 102.836029 |
| 30 | SiO2 | 151.235606 |
| 31 | Nb2O5 | 76.671595 |
| 32 | SiO2 | 135.237111 |
| 33 | Nb2O5 | 99.608324 |
| 34 | SiO2 | 161.797651 |
| 35 | Nb2O5 | 77.413062 |
| 36 | SiO2 | 131.503309 |
| 37 | Nb2O5 | 94.771406 |
| 38 | SiO2 | 168.571161 |
| 39 | Nb2O5 | 80.958326 |
| 40 | SiO2 | 128.724034 |
| 41 | Nb2O5 | 88.765883 |
| 42 | SiO2 | 172.451601 |

TABLE 7-continued design structure of a steep 532 nm
beamsplitter for 45° Angle of incidence:
532 nm Deeply Blocking Steep Beamsplitter
Coating Thickness (μm): 28.441678135

Total Layers: 240

| Layer | Material | Thickness (nm) |
|---|---|---|
| 43 | Nb2O5 | 85.879418 |
| 44 | SiO2 | 128.608638 |
| 45 | Nb2O5 | 82.76891 |
| 46 | SiO2 | 171.164311 |
| 47 | Nb2O5 | 91.683182 |
| 48 | SiO2 | 131.169369 |
| 49 | Nb2O5 | 78.174113 |
| 50 | SiO2 | 165.223996 |
| 51 | Nb2O5 | 96.979355 |
| 52 | SiO2 | 135.753497 |
| 53 | Nb2O5 | 75.953529 |
| 54 | SiO2 | 155.54757 |
| 55 | Nb2O5 | 100.806536 |
| 56 | SiO2 | 142.76079 |
| 57 | Nb2O5 | 74.918393 |
| 58 | SiO2 | 145.729079 |
| 59 | Nb2O5 | 101.128401 |
| 60 | SiO2 | 152.577714 |
| 61 | Nb2O5 | 75.495573 |
| 62 | SiO2 | 137.404314 |
| 63 | Nb2O5 | 98.714134 |
| 64 | SiO2 | 161.823972 |
| 65 | Nb2O5 | 77.800849 |
| 66 | SiO2 | 131.799092 |
| 67 | Nb2O5 | 93.62446 |
| 68 | SiO2 | 169.469091 |
| 69 | Nb2O5 | 81.286423 |
| 70 | SiO2 | 129.760412 |
| 71 | Nb2O5 | 87.106824 |
| 72 | SiO2 | 172.74435 |
| 73 | Nb2O5 | 86.67709 |
| 74 | SiO2 | 129.628565 |
| 75 | Nb2O5 | 81.980207 |
| 76 | SiO2 | 169.63066 |
| 77 | Nb2O5 | 93.161138 |
| 78 | SiO2 | 131.596083 |
| 79 | Nb2O5 | 78.207451 |
| 80 | SiO2 | 162.830265 |
| 81 | Nb2O5 | 97.829036 |
| 82 | SiO2 | 138.108686 |
| 83 | Nb2O5 | 75.326723 |
| 84 | SiO2 | 153.591247 |
| 85 | Nb2O5 | 100.724734 |
| 86 | SiO2 | 145.680217 |
| 87 | Nb2O5 | 75.197663 |
| 88 | SiO2 | 144.136845 |
| 89 | Nb2O5 | 100.023055 |
| 90 | SiO2 | 155.996046 |
| 91 | Nb2O5 | 75.797013 |
| 92 | SiO2 | 136.731146 |
| 93 | Nb2O5 | 96.701027 |
| 94 | SiO2 | 164.807958 |
| 95 | Nb2O5 | 78.485102 |
| 96 | SiO2 | 131.486595 |
| 97 | Nb2O5 | 91.416386 |
| 98 | SiO2 | 170.843571 |
| 99 | Nb2O5 | 82.948453 |
| 100 | SiO2 | 129.597724 |
| 101 | Nb2O5 | 85.684493 |
| 102 | SiO2 | 171.307995 |
| 103 | Nb2O5 | 89.26102 |
| 104 | SiO2 | 130.290103 |
| 105 | Nb2O5 | 80.451223 |
| 106 | SiO2 | 167.153794 |
| 107 | Nb2O5 | 95.259769 |
| 108 | SiO2 | 133.387034 |
| 109 | Nb2O5 | 77.191911 |
| 110 | SiO2 | 158.612514 |
| 111 | Nb2O5 | 99.755764 |
| 112 | SiO2 | 139.656216 |
| 113 | Nb2O5 | 75.567149 |
| 114 | SiO2 | 149.125107 |
| 115 | Nb2O5 | 101.280773 |
| 116 | SiO2 | 148.680223 |
| 117 | Nb2O5 | 75.567766 |
| 118 | SiO2 | 140.751704 |
| 119 | Nb2O5 | 99.493004 |
| 120 | SiO2 | 158.91319 |
| 121 | Nb2O5 | 76.931062 |
| 122 | SiO2 | 133.924406 |
| 123 | Nb2O5 | 95.587146 |
| 124 | SiO2 | 167.046455 |
| 125 | Nb2O5 | 79.941891 |
| 126 | SiO2 | 130.595713 |
| 127 | Nb2O5 | 90.061043 |
| 128 | SiO2 | 171.52332 |
| 129 | Nb2O5 | 84.639663 |
| 130 | SiO2 | 129.724731 |
| 131 | Nb2O5 | 84.731083 |
| 132 | SiO2 | 170.853256 |
| 133 | Nb2O5 | 90.506855 |
| 134 | SiO2 | 130.698407 |
| 135 | Nb2O5 | 80.919633 |
| 136 | SiO2 | 166.148719 |
| 137 | Nb2O5 | 95.948475 |
| 138 | SiO2 | 134.107378 |
| 139 | Nb2O5 | 78.455937 |
| 140 | SiO2 | 160.402121 |
| 141 | Nb2O5 | 99.679602 |
| 142 | SiO2 | 138.661918 |
| 143 | Nb2O5 | 77.568835 |
| 144 | SiO2 | 155.399004 |
| 145 | Nb2O5 | 101.437398 |
| 146 | SiO2 | 143.460187 |
| 147 | Nb2O5 | 77.747731 |
| 148 | SiO2 | 150.835494 |
| 149 | Nb2O5 | 102.425545 |
| 150 | SiO2 | 147.617068 |
| 151 | Nb2O5 | 77.514841 |
| 152 | SiO2 | 148.320077 |
| 153 | Nb2O5 | 102.383455 |
| 154 | SiO2 | 150.835187 |
| 155 | Nb2O5 | 77.594384 |
| 156 | SiO2 | 144.567254 |
| 157 | Nb2O5 | 101.963371 |
| 158 | SiO2 | 153.995372 |
| 159 | Nb2O5 | 77.581 |
| 160 | SiO2 | 139.575503 |
| 161 | Nb2O5 | 100.629357 |
| 162 | SiO2 | 158.270796 |
| 163 | Nb2O5 | 78.23092 |
| 164 | SiO2 | 134.943788 |
| 165 | Nb2O5 | 97.362407 |
| 166 | SiO2 | 164.518246 |
| 167 | Nb2O5 | 79.948805 |
| 168 | SiO2 | 131.020116 |
| 169 | Nb2O5 | 92.463462 |
| 170 | SiO2 | 169.687184 |
| 171 | Nb2O5 | 83.612812 |
| 172 | SiO2 | 129.311392 |
| 173 | Nb2O5 | 86.405451 |
| 174 | SiO2 | 171.732418 |
| 175 | Nb2O5 | 88.583284 |
| 176 | SiO2 | 129.57488 |
| 177 | Nb2O5 | 81.449042 |
| 178 | SiO2 | 168.473041 |
| 179 | Nb2O5 | 94.322516 |
| 180 | SiO2 | 131.891973 |
| 181 | Nb2O5 | 77.64882 |
| 182 | SiO2 | 160.980285 |
| 183 | Nb2O5 | 99.082782 |
| 184 | SiO2 | 136.972706 |
| 185 | Nb2O5 | 76.270067 |
| 186 | SiO2 | 150.794779 |

TABLE 7-continued design structure of a steep 532 nm
beamsplitter for 45° Angle of incidence:
532 nm Deeply Blocking Steep Beamsplitter
Coating Thickness (μm): 28.441678135

Total Layers: 240

| Layer | Material | Thickness (nm) |
|---|---|---|
| 187 | Nb2O5 | 101.82662 |
| 188 | SiO2 | 144.810218 |
| 189 | Nb2O5 | 76.247458 |
| 190 | SiO2 | 142.197031 |
| 191 | Nb2O5 | 101.08276 |
| 192 | SiO2 | 154.472747 |
| 193 | Nb2O5 | 76.645516 |
| 194 | SiO2 | 135.588916 |
| 195 | Nb2O5 | 97.089812 |
| 196 | SiO2 | 164.201697 |
| 197 | Nb2O5 | 78.884226 |
| 198 | SiO2 | 130.455866 |
| 199 | Nb2O5 | 92.066688 |
| 200 | SiO2 | 170.656157 |
| 201 | Nb2O5 | 82.645702 |
| 202 | SiO2 | 129.356456 |
| 203 | Nb2O5 | 86.614591 |
| 204 | SiO2 | 172.151688 |
| 205 | Nb2O5 | 88.107814 |
| 206 | SiO2 | 129.509539 |
| 207 | Nb2O5 | 81.813237 |
| 208 | SiO2 | 168.307689 |
| 209 | Nb2O5 | 94.040778 |
| 210 | SiO2 | 131.741612 |
| 211 | Nb2O5 | 78.477373 |
| 212 | SiO2 | 161.070545 |
| 213 | Nb2O5 | 99.303611 |
| 214 | SiO2 | 135.909174 |
| 215 | Nb2O5 | 76.189676 |
| 216 | SiO2 | 153.895605 |
| 217 | Nb2O5 | 101.524691 |
| 218 | SiO2 | 142.414629 |
| 219 | Nb2O5 | 75.918059 |
| 220 | SiO2 | 143.004075 |
| 221 | Nb2O5 | 104.234156 |
| 222 | SiO2 | 148.478627 |
| 223 | Nb2O5 | 76.261156 |
| 224 | SiO2 | 136.688637 |
| 225 | Nb2O5 | 104.346797 |
| 226 | SiO2 | 156.347975 |
| 227 | Nb2O5 | 75.50798 |
| 228 | SiO2 | 131.274802 |
| 229 | Nb2O5 | 106.072884 |
| 230 | SiO2 | 161.095229 |
| 231 | Nb2O5 | 73.862257 |
| 232 | SiO2 | 123.798118 |
| 233 | Nb2O5 | 120.45028 |
| 234 | SiO2 | 139.021448 |
| 235 | Nb2O5 | 61.510898 |
| 236 | SiO2 | 186.49687 |
| 237 | Nb2O5 | 110.855316 |
| 238 | SiO2 | 95.411626 |
| 239 | Nb2O5 | 112.998509 |
| 240 | SiO2 | 85.040064 |

Figure 16:
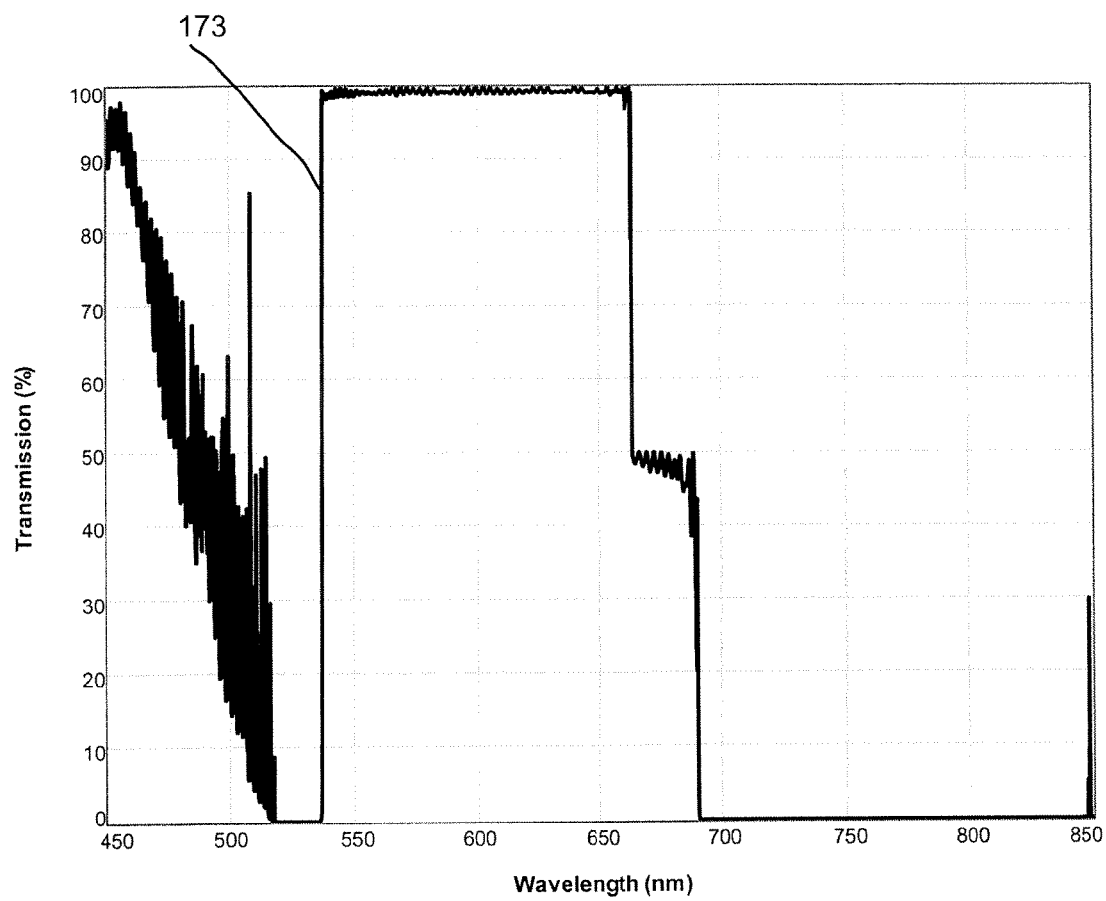
FIG. 16 is a measured spectrum of a deeply blocking, steep 532 nm edge filter measured at 45° Angle of incidence.
Figure 17:
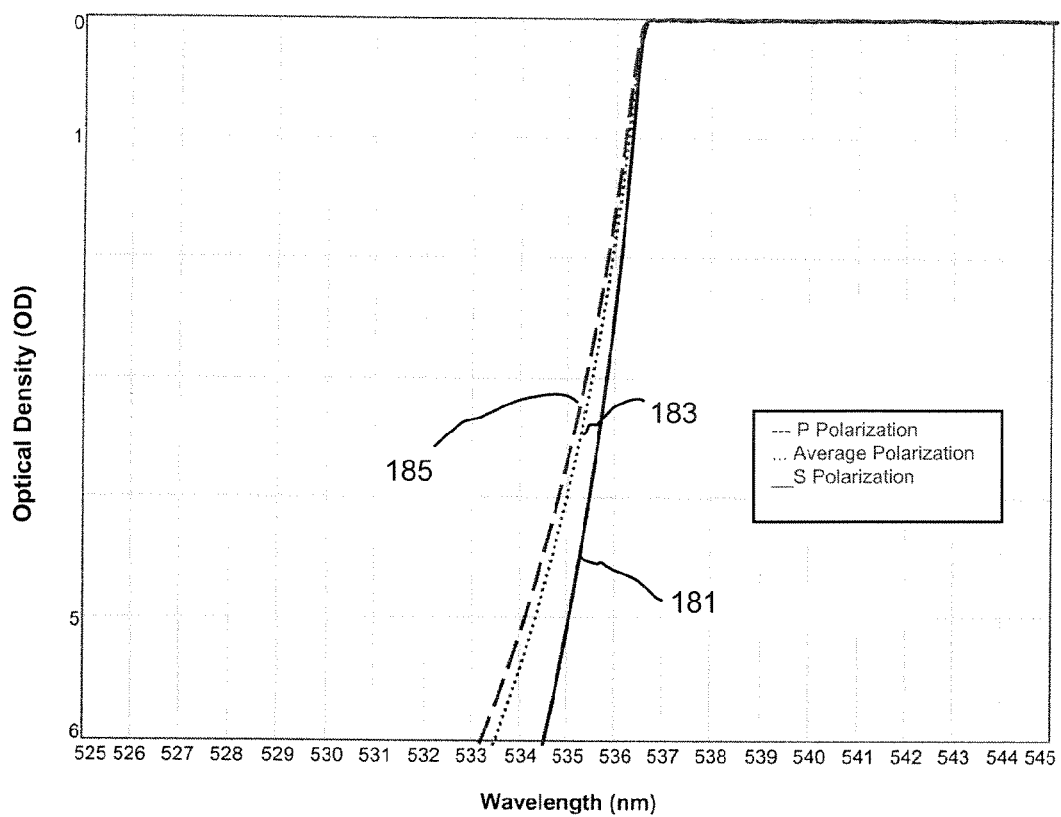
FIG. 17. is a magnified portion of a design spectrum of a deeply blocking, steep 532 nm edge filter measured at 45° Angle of incidence.

Like the above examples, the design for the filter of example 8 was produced by optimizing a standard dichroic filter comprising alternating quarter wavelength thick layers of $SiO_2$ and $Nb_2O_5$. However, in this case, the basic structure and spectra were optimized against the target spectra 173, 181, 183, and 185 shown in FIGS. 16 and 17.

The calculated spectrum of this design exhibited a fundamental stopband region having a short wave edge around 690 nm and a long wave edge around 850 nm. The calculated spectrum also exhibited a non-harmonic stopband having a long wave edge around 540 nm, and a shortwave edge around 520 nm. A passband region separated the fundamental and non-harmonic stopband regions, and had a passband bandwidth of 23.5%, relative to the long wave edge of the non-harmonic stopband. The edge steepness (10-90% T of the long wave edge of the non-harmonic stopband was 0.10%. Finally, the calculated spectrum shows that the design substantially blocks 100% of light (OD 6 or greater) having a wavelength within the fundamental and non-harmonic stopband regions.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An interference filter for non-zero-angle of incidence spectroscopy, comprising:
    a substrate, and
    a plurality of alternating first and second material layers deposited on said substrate, said material layers having respectively different refractive indices,
    wherein said plurality of alternating first and second material layers are configured such that when light from a light source impinges on said filter at an Angle of incidence of about 45°, said filter defines a spectrum for s-polarized light and a spectrum for p-polarized light, each spectrum comprising a first stopband region and a second stopband region separated by a passband region having a passband bandwidth of at least about 25% of an edge wavelength for light of average polarization corresponding to the second stopband region; and
    said filter exhibits polarization splitting of about ≤0.5%, relative to said edge wavelength;
    wherein said first stopband region is associated with a fundamental stopband, and said second stopband region is associated with at least one of: a harmonic stopband of the fundamental stopband and a non-harmonic stopband of the fundamental stopband.

2. The interference filter of claim 1, wherein said passband bandwidth of at least about 25% of said edge wavelength is a passband bandwidth of at least about 50% of the edge wavelength.

3. The interference filter of claim 1, wherein said passband bandwidth of at least about 25% of said edge wavelength is a passband bandwidth of at least about 58% of the edge wavelength.

4. The interference filter of claim 1, wherein said polarization splitting is ≤0.25%, relative to said edge wavelength.

5. The interference filter of claim 1, wherein said second stopband region is associated with the non-harmonic stopband of said fundamental stopband.

6. The interference filter of claim 1, wherein said second stopband region corresponds to a passband defect.

7. The interference filter of claim 1, wherein said first stopband region and said second stopband region are present in distinct wavelength ranges within the 425 nm to about 1250 nm region of the electromagnetic spectrum.

8. The interference filter of claim 1, wherein said second stopband region transmits ≤10% of light having a wavelength within the second stopband region.

9. The interference filter of claim 8, wherein said second stopband region transmits substantially 0% of light having a wavelength within the second stopband region.

10. The interference filter of claim 8, wherein said second stopband region is associated with a non-harmonic stopband of said fundamental stopband.

11. The interference filter of claim 8, wherein said light having a wavelength within said second stopband region originates from said light source, said light source configured to provide substantially monochromatic light having a wavelength $\lambda_L$, wherein $\lambda_L$ is chosen from 532.0 nm and 785.0 nm.

12. A spectroscopy system, comprising:
an input light source capable of providing excitation light having at least a wavelength in an excitation band of a sample to be analyzed;
a dichroic beamsplitter optical filter configured to direct said excitation light onto said sample, and substantially transmit light scattered by said sample having a corresponding shift in wavelength; and
a detector for detecting light scattered by said sample;
wherein said dichroic beamsplitter optical filter comprises:
a substrate, and
a plurality of alternating first and second material layers deposited on said substrate, said material layers having respectively different refractive indices,
wherein said plurality of alternating first and second material layers are configured such that when light from said input light source impinges on said dichroic beamsplitter optical filter at an Angle of incidence of about 45°, said dichroic beamsplitter optical filter defines a spectrum for s-polarized light and a spectrum for p-polarized light, each spectrum comprising a first stopband region and a second stopband region separated by a passband region of at least about 25% of an edge wavelength for light of average polarization corresponding to the second stopband region;
wherein said dichroic beamsplitter optical filter exhibits polarization splitting of less than about 0.5% relative to the edge wavelength; and
wherein said first stopband region is associated with a fundamental stopband, and said second stopband region is associated with at least one of: a harmonic stopband of the fundamental stopband and a non-harmonic stopband of the fundamental stopband.

13. The spectroscopy system of claim 12, wherein said input light source provides substantially monochromatic light having a wavelength $\lambda_L$, and said dichroic beamsplitter optical filter transmits less than 2% of said substantially monochromatic light.

14. The spectroscopy system of claim 13, wherein $\lambda_L$ is chosen from 532.0 nm and 785.0 nm.

15. The spectroscopy system of claim 13, wherein said dichroic beamsplitter optical filter blocks substantially 100% of said substantially monochromatic light.

* * * * *